United States Patent
Carlin et al.

(10) Patent No.: US 6,898,235 B1
(45) Date of Patent: May 24, 2005

(54) WIDEBAND COMMUNICATION INTERCEPT AND DIRECTION FINDING DEVICE USING HYPERCHANNELIZATION

(75) Inventors: Joe Carlin, Ashburn, VA (US); Terry Collins, Springfield, VA (US); Peter Hays, Fairfax, VA (US); Barry E. Hemmerdinger, Annandale, VA (US); Robert L. Kellogg, Rockville, MD (US); Robert L. Kettig, Herndon, VA (US); Bradley K. Lemmon, Herndon, VA (US); Thomas E. Murdock, Burke, VA (US); Robert S. Tamaru, Reston, VA (US); Stuart M. Ware, Silver Spring, MD (US)

(73) Assignee: Argon ST Incorporated, Fairfax, VA (US)

(*) Notice: Subject to any disclaimer, the term of this patent is extended or adjusted under 35 U.S.C. 154(b) by 0 days.

(21) Appl. No.: 09/457,724

(22) Filed: Dec. 10, 1999

(51) Int. Cl.$^7$ .............................. H04B 1/38; H04L 5/16
(52) U.S. Cl. ...................... 375/219; 375/316; 342/147; 342/423
(58) Field of Search ................................ 375/219, 259, 375/316, 377; 708/400, 403, 404, 420; 342/147, 158, 192, 194, 195, 196, 367, 417, 423, 444, 445, 450, 465; 324/207.11

(56) References Cited

U.S. PATENT DOCUMENTS

| | | | | |
|---|---|---|---|---|
| 3,887,923 A | * | 6/1975 | Hendrix ....................... | 342/424 |
| 5,168,214 A | * | 12/1992 | Engeler et al. .......... | 324/76.33 |
| 5,260,968 A | * | 11/1993 | Gardner et al. ............. | 375/347 |
| 5,444,451 A | * | 8/1995 | Johnson et al. ............. | 342/453 |
| 5,515,300 A | * | 5/1996 | Pierce ......................... | 702/190 |
| 5,625,624 A | * | 4/1997 | Rosen et al. ................ | 370/307 |
| 5,815,117 A | * | 9/1998 | Kolanek ..................... | 342/442 |
| 6,128,276 A | * | 10/2000 | Agee .......................... | 370/208 |
| 6,229,998 B1 | * | 5/2001 | Hamdy et al. .......... | 455/226.1 |
| 6,230,026 B1 | * | 5/2001 | Schwaller et al. .......... | 455/561 |
| 6,446,025 B1 | * | 9/2002 | Nakamura et al. ......... | 702/159 |
| 6,600,774 B1 | * | 7/2003 | Otto .......................... | 375/139 |
| 2001/0046225 A1 | * | 11/2001 | Schwaller et al. ......... | 370/343 |

* cited by examiner

Primary Examiner—Jean B. Corrielus
(74) Attorney, Agent, or Firm—Reed Smith LLP; Stanley P. Fisher, Esq.; Juan Carlos A. Marquez, Esq.

(57) ABSTRACT

A physically compact, wideband signal activity identification, demodulation and characterization, and direction finding device incorporates multiple and cascadable digital signal processing modules operating in asynchronous real time. The digital signal processing modules include a device for data buffering, a device for digital signal processing (DSP), and a device for high-speed data routing. The module device for data buffering is composed of, among other memory devices, a First In Tap Out (FITO) data buffer that may be accessed at any point for delay or faster than real time resynchronization by the DSP module device. The module device for digital signal processing function incorporates a general purpose digital processor for respective module calculation of overlapped hyperchannelization Fast Fourier Transforms (FFT). Hyperchannels may be combine in a flexible manner to tailor channel bandwidth for optimum signal spectral detection of signal activity, synthesis filter and tuning, demodulation and recognition, and direction finding. The module device for high-speed data routing is composed of one-to-one, one-to-many, or many-to-one digital data routing functions, and allows flexible ordering of digital signal processing modules.

63 Claims, 20 Drawing Sheets

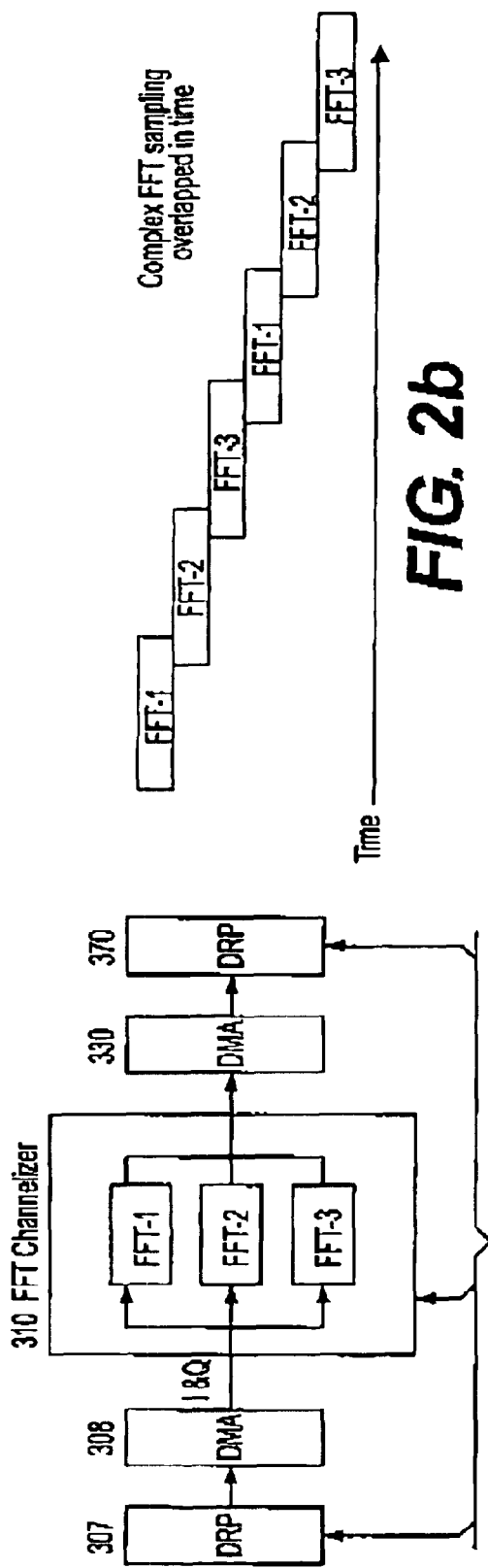
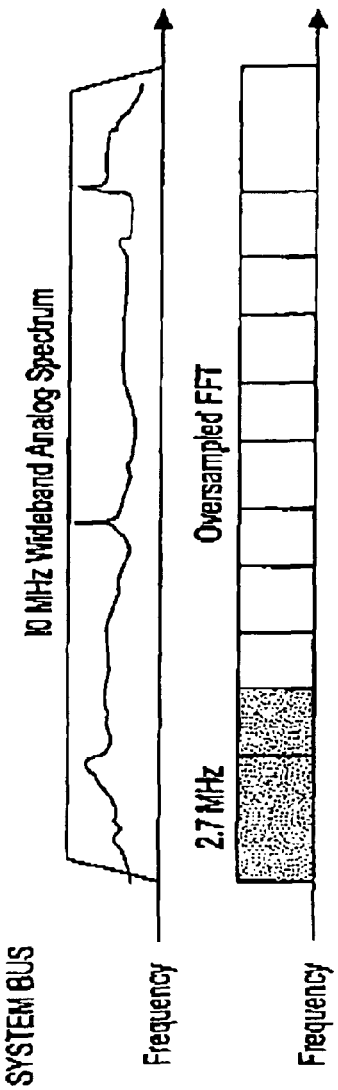
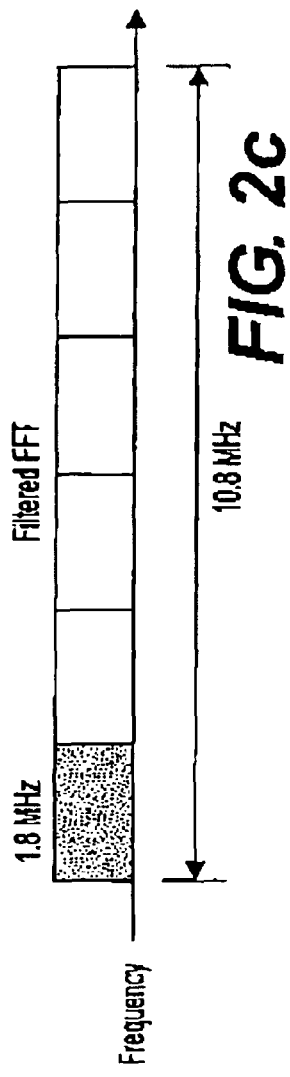
*FIG. 2b*
*FIG. 2a*
*FIG. 2c*

WIDEBAND COMMUNICATION INTERCEPT AND DIRECTION FINDING DEVICE USING HYPERCHANNELIZATION

The invention disclosed and claimed in this application was developed in connection with a contract with the U.S. Government, who as a consequence may have rights in the invention.

BACKGROUND OF THE INVENTION

1. Field of the Invention

The present invention relates in general, to communication, and in particular, to a communication intercept device using digitally programmable devices to channelize, detect, and recognize arbitrary signals. The present invention involves the use of a new and improved variable delay First-In-Tap-Out (FITO) spectral memory storage, a two-stage synthesis filter for improved dynamic range and programmable software digital receivers that use spectral synthesis rather than numerically controlled oscillators for signal demodulation.

In addition, the present invention relates to detection, demodulation, and determination of direction of signal activity, and in particular, to a signal intercept and direction finding device using general purpose commercial-off-the-shelf (COTS) digitally programmable devices to hyperchannelize radio or acoustical spectrum into spectral cells narrower than the signal structure of interest so as to detect, synthesize, and recognize arbitrary signal activity, and determine signal direction by phase determination of angle of arrival or time difference of arrival.

Overall, the present invention relates to a new and improved multiple and cascadable module device using general purpose digital processing, organized in a fashion that each module of respective digital signal processing means comprises data buffering, digital signal processing and high-speed data routing devices.

2. Discussion of the Related Art

A communication intercept device typically employs a wideband receiver that amplifies and down converts a large portion of the radio frequency spectrum. For the detection of narrowband signals, the wideband receiver output is channelized by some means such as acousto-optic Bragg cells and photo detectors, surface acoustic wave (SAW) devices and programmable digital Fast Fourier Transformation (FFT) devices.

The digital FFT based channelizer is more flexible than the acousto-optic or SAW device, and is capable of providing complex (real and imaginary) spectral segments sampled above the Nyquist rate. In many applications the channelization segments match the bandwidth of the intended receive signal, and each channelization segment is therefore connected to a digital signal processing (DSP) device. For example, a series of U.S. Pat. Nos. 5,535,240, 5,537,435 and 5,848,097 commonly entitled "TRANSCEIVER APPARATUS EMPLOYING WIDEBAND FFT CHANNELIZER AND INVERSE FFT COMBINER FOR A MULTICHANNEL COMMUNICATION NETWORK" disclose a transceiver apparatus that employs this fundamental architecture.

To reduce the number of DSP devices (e.g. digital drop receivers) required in an intercept system, strategies are used to find the spectral channels of activity. For example, U.S. Pat. No. 5,428,667, entitled "MULTI-CHANNEL CELLULAR COMMUNICATIONS INTERCEPT SYSTEM" discloses a device wherein one or more of the plurality of channelized outputs are selected for continuous demodulation. The selected channels are the cellular forward control channels that contain formatted instructions to mobile radios, establishing the immediate use of narrowband duplex channels for cellular network communication. The intent of this invention is to determine the cell channel assignments from the control channels and assign only a small plurality of drop receivers to the cell channels in immediate use. Estimates of the number of drop receivers required to satisfy the demand to a level of confidence can be determined by Poisson statistics based on channel activity and cellular call duration as those skilled in the art are well aware.

Further enhancements to wideband intercept systems have been made. U.S. Pat. No. 5,812,609, entitled "COMMUNICATION INTERCEPT DEVICE USING DIGITAL DROP RECEIVERS IN MULTIPLE TIERS" discloses a device that uses a plurality of digital drop receivers in a configuration using a plurality of tiers. This device uses fewer digital drop receivers than one per voice grade channel but allows the monitoring of all narrowband signals of interest. As exemplified in the device description, the first analog to digital converter (ADC) is connected to a first memory that stores the digitized wideband signal. A plurality of first digital drop receivers is connected to the first memory for selecting various wideband signals in a multiplexed fashion under control of a controller. The output of a first digital drop receiver is connected to a second memory for storing the medium band signals of interest. The second memory has an input connected to the output of each of said first plurality of digital drop receivers, storing the signals selected. A second plurality of digital drop receivers in a second tier is connected to the second memory for further selection of various narrowband signals of interest in a multiplex fashion under control of the controller.

Additional enhancements have been made to wideband communication devices, including dynamic signal routing and wideband gain control. U.S. Pat. No. 5,590,156 entitled "MULTICHANNEL WIDEBAND DIGITAL RECEIVER MAKING USE OF MULTIPLE WIDEBAND TUNERS HAVING INDIVIDUALLY SELECTABLE GAINS TO EXTEND OVERALL SYSTEM DYNAMIC RANGE" discloses a wideband digital receiving device that processes and converts from analog to digital representation the bandwidth in a plurality of sub-bands. The output of each sub-band is channelized using a complex FFT engine and convolution filtering. According to the device description, the convolution filter may be a so-called overlap and add digital filter, or may be a polyphase digital filter. Each digital channel signal corresponding to a digitized version of the communication signal transmitted by one of the subscriber units. Before passing the individual digital channel signals to the DSP processors, each digital channel signal output may also be processed by a sample rate adjuster that provides samples of its respective digital channel signal taken at or near a position of peak symbol amplitude. Other aspects of the invention describe amplifier attenuation factors on the wideband receivers based on received signal strength indicator (RSSI) made at the output of the channelizer by the DSP processors. As part of the communication network, forward channel control reassignment is made to subscriber frequencies, grouping like RSSI amplitude signals in frequency channels of a common wideband receiver, thereby maximizing channel path ADC performance.

Multichannel wideband digital receivers are extended to perform direction finding by angle of arrival. U.S. Pat. No. 5,815,117 entitled "DIGITAL DIRECTION FINDING RECEIVER" discloses a multichannel device capable of receiving radar pulse signals simultaneously from a plurality of antennas. Each respective antenna signal is received and analog to digital converted. A first antenna digital channelizer divides the received antenna signal into N digital frequency channels covering the received spectrum. A threshold detector means determines pulse signal presence in a respective channel and tunes a digital local oscillator (LO) to the channel frequency as reference. A plurality of digital down converters receive respective plurality of delayed antenna digital signals from a First in First Out (FIFO) buffer and respective tuning digital LO reference. The plurality of digital downconverters output tuned and filtered narrowband signals that are phase coherent. The narrowband antenna signal outputs are received by a phase detector that compares phase of the first antenna narrowband antenna signal output to all subsequent antenna narrowband antenna signal outputs. The plurality of signal phase angles and respective signal amplitudes is used in a conventional manner by an angle of arrival encoder to estimate the direction of a signal in the selected channel.

Although wideband receivers and channelizers with drop receivers and multichannel processors have been used in the past, it will be readily appreciated that improvements are needed to: (1) provide improved signal detection and direction finding of signals whose bandwidth do not match a fixed channel bandwidth, (2) provide functional isolation and graceful system degradation by re-routing data from one module processing device to another, (3) provide flexible ordering of the module processing functions, including detection, demodulation and angle of arrival processes, and (4) provide efficient digital signal processing using general purpose digital processors devices for lower cost and long term supportability.

SUMMARY OF THE INVENTION

It is an object of the present invention to intercept a wideband RF signal environment, sub-band and channelize said signal into a plurality of complex spectral segments and select therefrom a plurality of narrowband signals in a flexible manner by combining spectral segments in time and frequency for improvement in signal detection and demodulation of arbitrary narrowband modulation types and bandwidths.

It is another object of the present invention to channelize a wideband RF signal environment and select therefrom a plurality of narrowband signals using a spectral detector employing short-term, medium-term, and delayed long-term spectral averages to determine the time of onset of each new narrowband signal.

It is another object of the present invention to initiate a demodulation process on complex spectral data for each new narrowband signal detected using variable delayed data from memory storage in a manner that the demodulation process starts at the beginning presence of each detected narrowband spectral energy.

More particularly, in accordance with the present invention, the time-overlapped FFT-based channelizers employed in their respective receiver sub-band paths do not make use of time-window filters or convolution filters of any kind, thus allowing a choice of filtering at later stages. The detection process employs convolution filtering (e.g. Nuttal) of the complex spectral data. The demodulation process requires higher dynamic range and employs a two-stage synthesis filter (e.g. overlap and add) before complex time domain data (i.e. filtered and transformed complex spectral data) is output to a plurality of software digital receivers for demodulation.

It is another object of the present invention to use a plurality of software digital receivers for demodulation of certain types of narrowband signals (e.g. two software digital receivers may be employed respectively to demodulate the mark and the space of a BFSK signal). This demodulation process allows significant elimination of interfering signal energy by precise tuning of narrowband filters.

BRIEF DESCRIPTION OF THE DRAWINGS

FIG. 2a diagrammatically illustrates output of time series data from data router port 307 and respective DMA buffer 308 to a respective overlap FFT channelizer device 310 comprising three FFT engines producing a complex spectra output connected to a respective output DMA buffer 330 and output high-speed data router port 370 according to the present invention;

FIG. 2b schematically illustrates respective three FFT engines FFT-1, FFT-2 and FFT-3 of FFT channelizer 310 producing output of time overlapped samples of complex spectra;

FIG. 2c schematically illustrates the band filtered RF spectral data, the segmented RF complex spectral data from first respective FFT engine, and segmented RF complex spectral data from collective FFT-1 to FFT-3 output after filtering;

DETAILED DESCRIPTION OF THE PREFERRED EMBODIMENTS

Figure 1A:
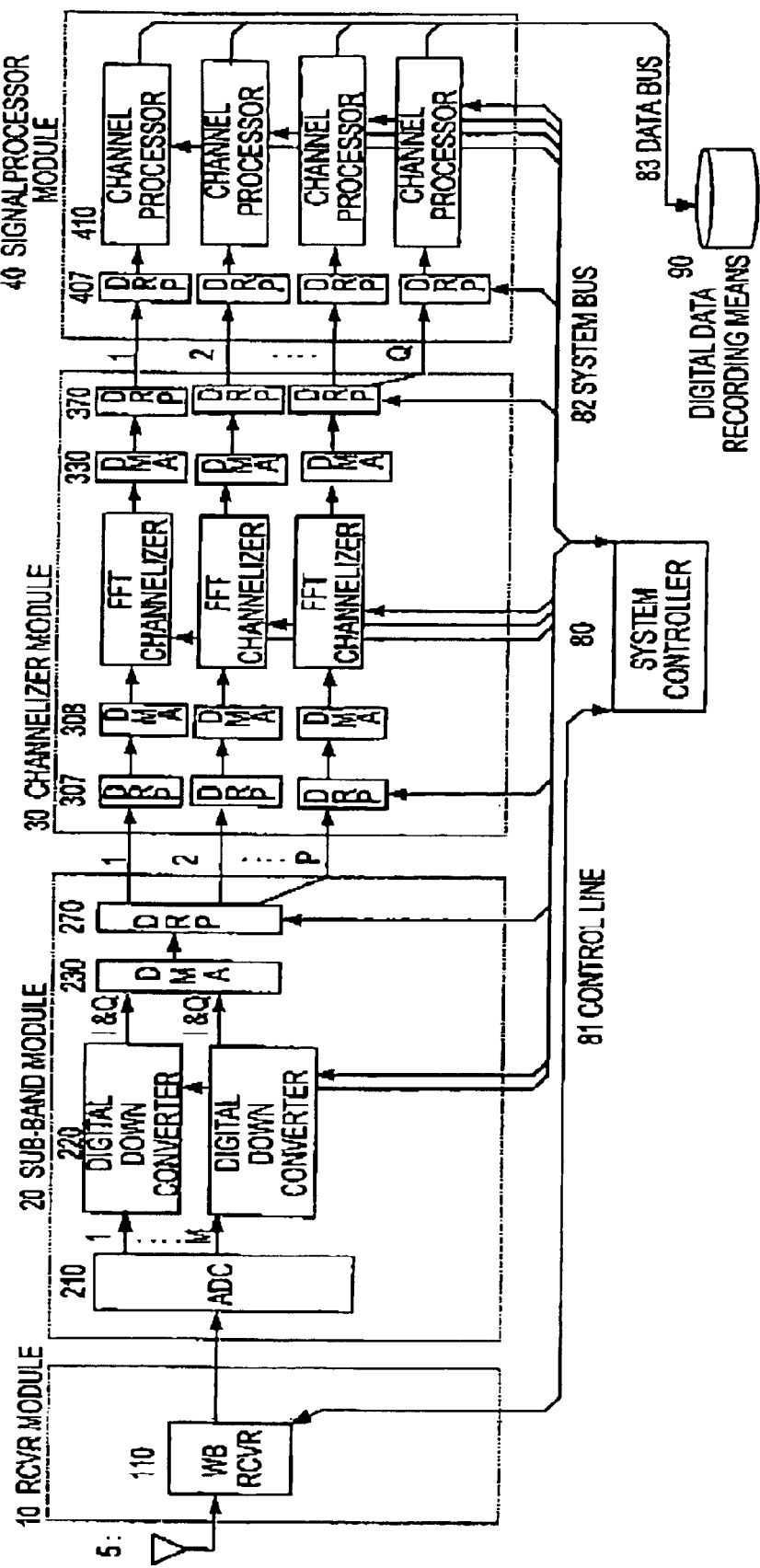
FIG. 1a diagrammatically illustrates a single sensor embodiment of the invention, channelizing wideband sensor input into a plurality of sub-bands and channels for signal processing with sensor antenna 5 connected to a wideband receiver module 10 comprising wideband receiver 110 connected to a sub-band module 20 comprising analog to digital converter 210, a plurality of digital down converters 220, collective DMA buffer 230 and output data router port 270 connected to channelizer module 30 comprising a plurality of input data router ports 307 and respective DMA buffers 308 that output to a plurality of FFT channelizers devices 310 and respective output DMA buffers 330 and output data router ports 370 connected to signal processing module 40 comprising a plurality of input data router ports 407, a plurality of channel processors 410 connected to collective data output bus 83 connected to digital recording means 90 under the control of a system controller 80 controlling apparatus by means of control line 81 and system bus 82 and data router ports 270, 307, 370, 407 interconnected by means of data router device 70 (not shown)

With reference to the figures, like reference characters will be used to indicate like elements throughout the several embodiments and views thereof. Before describing in detail the particular improved wideband multichannel receiving device in accordance with the present invention, it should be observed that the present invention resides primarily in a novel combination of commercially available communication and signal processing circuits and components and not in the particular detailed configurations thereof. Accordingly, the structure, control, and arrangement of these conventional circuits and components have been illustrated in the drawings by readily understandable block diagrams that show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major components of the system in a convenient functional grouping, whereby the present invention may be more readily understood.

In addition, as one of skill in the art will understand from this disclosure of the invention, some components of the system may be implemented by hardware, other components may be implemented by software, while still other components may be implemented by either software or hardware, or even a combination of both. Specifically, as will be explained in more detail hereinafter, the invention is composed of elements that will occur or exist in pluralities (i.e., digital down converters, FFT channelizers, channel processors, FFT engines, recognition processors). One of skill in the art would understand that, if implemented as hardware, the embodiment of such plural components would involve parallel sets of such components that would be selectively activated depending upon the specific application of the system. If implemented as software, the embodiment of those components would be the activation of a subroutine, applet, etc. whereby the specific application of the system would determine the number of times that the subroutine is repeated or run simultaneously. In any event, such variations to the implementations of the invention would all be within the scope of this application and the claims therein.

Wideband Receiver

Referring now to FIG. 1*a*, the apparatus of the present invention is diagrammatically illustrated receiving radio frequency signals by means of an antenna 5 and wideband receiver 110. For convenience, the antenna source, and analog filtering circuitry are not shown. The wideband receiver 110 amplifies and down-converts to baseband a time domain analog signal containing the contents of all radio frequency signals received in a selected wideband band-pass. As a non-limiting example, the wideband receiver 110 may comprise a a high dynamic range receiver model 9104A, manufactured by Watkins Johnson with analog output of 10 MHZ in the High Frequency (HF) Spectrum (1–30 MHZ). Another example of a wideband receiver is the VXI-3570 manufactured by Cubic Cubic Corporation with tunable analog output of 4 MHZ bandwidth in the Very High Frequency (VHF) Spectrum (30–300 MHZ) and Ultra High Frequency (UHF) Spectrum (300–3000 MHZ). The wideband receiver 110 is tuned from a local control line 81 connected to the system controller 80.

The wideband radio frequency baseband output from the wideband receiver 10 is coupled to the high-speed analog to digital converter (ADC) 210 in the sub-band module 20. Advantageously, the dynamic range and sampling rate capability of currently commercially available ADCs, such as that referenced above, are sufficiently high that the signal environment is linearly represented over 80 dB dynamic range.

It should be observed that the present invention is not limited to 10 MHZ bandwidth or any other set of system parameters. The values given here are merely for the purposes of providing an illustrative example. Also, while the term 'wideband' is not limited to any particular spectral range, it is to be understood to imply a spectral coverage of at least an order of magnitude larger that the bandwidth of the majority of signals in that portion of the spectrum. Narrowband, on the other hand, implies only a portion of the spectrum, for example, the width of an individual channel (e.g. 3 kHz in HF, 30 kHz in VHF or UHF).

Sub-Band Module

The output of wideband receiver 110 of the receiver module 10 is received by the Sub-Band Module 20, which incorporates the analog-to-digital converter (ADC) 210, a plurality of Digital Down Converters (DDCs), a collective demand memory access (DMA) digital data buffer 230 and respective high-speed data router port 270.

Typical operation of an ADC would be slightly above the Nyquist sampling rate to ensure that the signal data is not aliased. For the present invention, the ADC 210 is operated significantly higher than the Nyquist sampling rate (e.g. for a wideband receiver bandwidth of 10 MHZ, the ADC sampling rate is 32.4 MHZ), ensuring that the complex signal is oversampled in time. This is an important feature of the present invention, allowing subsequent channelization, and channel recombination in time and frequency to occur without distortion. Another important feature of the present invention, allowing subsequent time of arrival measurements, is time synchronization of ADC operation, allowing data to be "time-tagged". The digital complex in-phase and quadrature (I&Q) oversampled signal data output is distributed to the plurality of Digital Down Converters (DDCs) 220 for sub-band tuning. In one embodiment, the DDCs 220 may be directly connected to the ADC 210 in a mezzanine assembly of a card chassis assembly (CCA). Alternatively, the time domain digital data from the ADC 210 may be received by a data buffer (not shown) and then outputted asynchronously to the DDCs 220.

In general, the DDCs 220 receive the analog-to-digital wideband data from the ADC 210 and output at or near baseband a respective small plurality of sub-band time domain complex digital data output for distribution by the high-speed data router port 270. In the preferred embodiment of the present invention, for a wideband receiver 110 with 10 MHZ bandwidth, the digital radio frequency signal is distributed to six DDCs 220, each respective ones DDC providing a 1.8 MHZ sub-band complex time-domain signal. The sub-band tuning of the DDCs 220 is determined by the system controller 80 connected to the respective ones DDCs by a system control bus 82 (e.g. VMEbus™).

The digitized data complex time domain signals output by the plurality of DDCs 220 are collectively buffered in a demand access memory (DMA) buffer 230 for access by a high-speed data router port 270 using the principles of Time Division Multiplex (TDM) access to the memory of the collective buffer 163. The collective buffer 163 may be implemented, for example by Application Specific Integrated Circuit (ASIC) components supplied on the EchoTek digital down converter card, Model ECDR-412.

High-speed TDM access of the data router port 270 to the memory data of the collective buffer 230 with data routing at clock rates substantially higher than the collective DDC data rates are output to one or more of a plurality of destination high speed data router ports. The TDM access and the data routing are configured by the system controller 80 that is connected to the high-speed data router for control of the respective data router ports by the system control bus 82 (e.g. VMEbus™). One-to-one or one-to-many high-speed data links may be implemented using, for example, RaceWay Interlink model ILK6 manufactured by Mercury Computer Systems, Inc.

In the preferred embodiment of the invention, high-speed data routing links are configured in a one-to-one arrangement from the plurality of DDCs 220 and respective collective DMA buffer 230 to a respective plurality of high-speed data router ports 307 for output to a plurality of FFT channelizers 310 in the Channelizer Module 30.

Again, it is to be understood that the term 'sub-band' is not limited to any particular spectral range, but imply a signal bandwidth larger that the bandwidth of the majority of signals in that portion of the RF or acoustic spectrum. In one embodiment of the invention, for HF radio data as an example, the digital down converters 220 would be configured to output six decimation sub-bands. Each respective sub-band would comprise near baseband complex time-series data at 2.7 mega-samples per second.

High-Speed Data Router

Time Division Multiplex (TDM) memory access is performed by high-speed data router ports to data at the collective buffer 230 and data routing are at clock rates substantially higher than the collective DDC 220 data rates. Data routing is configured by the system controller 80 that is connected to the high-speed data router 70 (not shown) and respective port 270 by the system control bus 82 (e.g. VMEbus™). It is to be understood that the high-speed data linkage is implemented by means of non-blocking data router ports that digitally interconnect modules according to various topologies.

In the preferred embodiment of the invention, high-speed data routing of one-to-one and one-to-many may be configured. Referring to FIG. 1a, the digitized data complex time domain signals of first DDC sub-band tuner 220 of sub-band module 20 is buffered by collective buffer 230 and routed from high-speed data port 270 by Time Division Multiplexing (TDM) to first high-speed data port 307 for asynchronous data buffering by first demand memory access (DMA) buffer 308 and output to first FFT channelizer 310 of channelizer module 30.

Further, non-blocking routing of one-to-many is illustrated. Referring to FIG. 1a, digital data complex time domain signals from respective plurality of DDC sub-band tuner components 220 are buffered by collective buffer 230 and routed from high-speed data port 270 by Time Division Multiplexing (TDM) means to respective plurality high-speed data ports 307 for asynchronous data buffering by respective plurality of DMA buffers 308 and output to respective plurality of FFT channelizers 310.

In the embodiment of the preferred invention, high-speed data routing links may be configured in a one-to-one or one-to-many arrangement from a P plurality of FFT channelizers to a Q plurality of channel processors. When configured for one-to-one links between respective FFT channelizer 310 and output to respective DMA buffer 330 for transfer by respective high-speed data router port 370, respective TDM data transfer is made to respective high-speed data router port 407 and output to respective channel processor 410.

Figure 3:
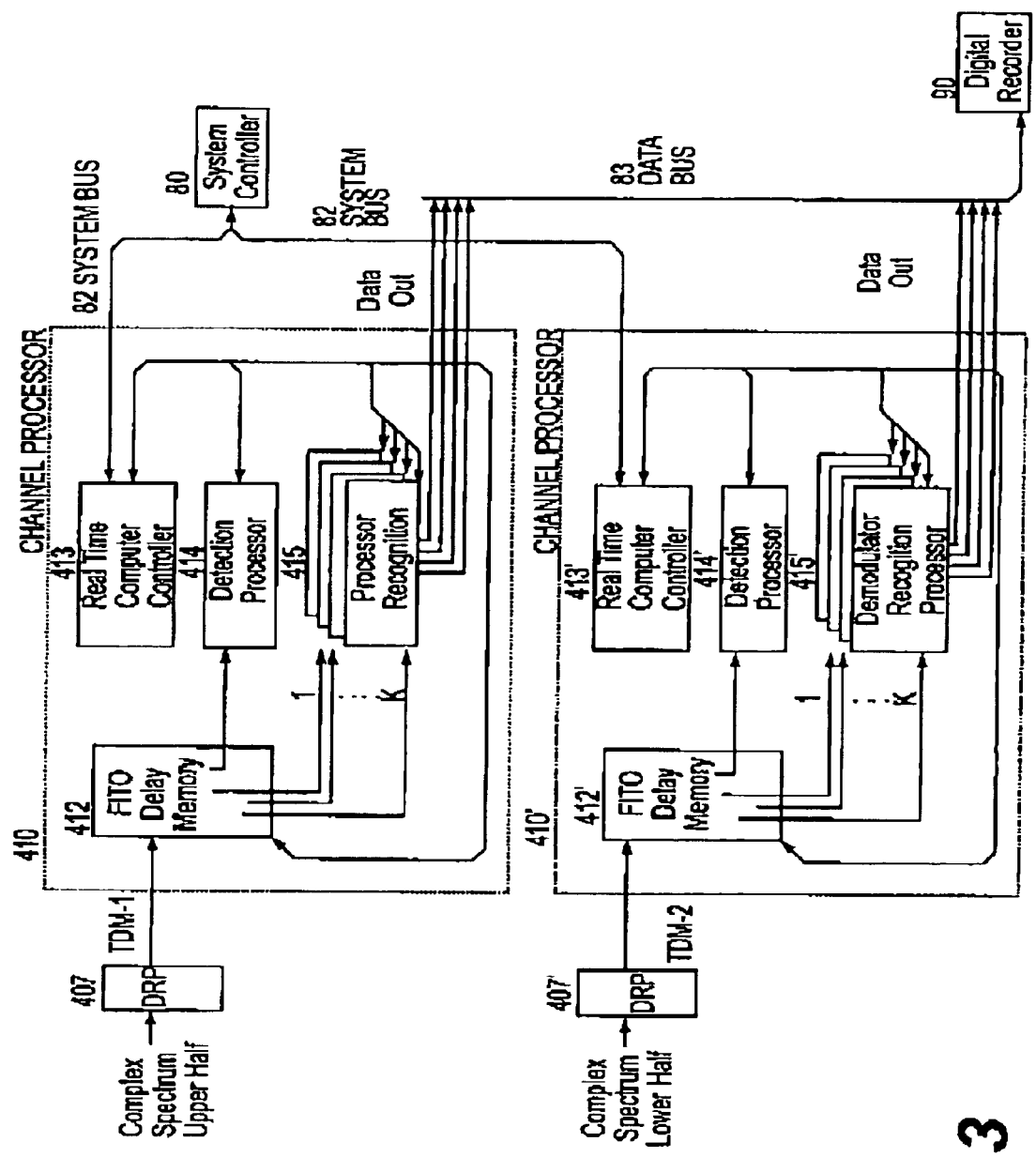
FIG. 3 diagrammatically illustrates output of complex spectral data segment upper half of spectrum band from high-speed data router port 407 and output of complex spectral data segment lower half of spectrum band from high-speed data router port 407' connected to respective channel processor 410 and 410'. Respective channel processors 410 and 410' comprise respective FITO delay memory 412, 412', respective detection processor 414, 414', respective recognition processor 415, 415' connected to respective DMA buffer 430 and 430' for output to digital recorder device 90 by means of data bus 83 with respective real-time computer controller 413, 413' connected to system controller 80 by means of system bus 82.

When configured, for example, for one-to-a plurality of links between one FFT channelizer and a plurality of channel processors, in the embodiment of the preferred invention, two channel processors are employed. Referring to FIG. 3, in such an arrangement, upper and lower halves of complex spectral data segments are output by an exemplified FFT channelizer 310' and DMA buffered 330' for asynchronous TDM transmission by respective high-speed data port 370'. High-speed data router port 370' separates complex spectral data segments into upper and lower complex spectral data segments, and transmits respective upper half and lower half spectral segments on links TDM-1 and TDM-2. Link TDM-1 of high-speed data router port 370' outputs upper half spectral data segments to respective high-speed data router port 407' providing asynchronous upper half spectral data segments to channel processor 410'. Link TDM-2 of high-speed data router port 370 outputs lower half spectral data segments to respective high-speed data router port 407" providing asynchronous lower half spectral data segments to channel processor 410".

Non-blocking routing of TDM high-speed data in one-to-one or one-to-many transfer links may be implemented using, for example, RaceWay Interlink data router Model ILK6 manufactured by Mercury Computer Systems, Inc.

FFT Channelizer

The channelizer module 20 is designed to receive time domain complex digital data from the high-speed data router port 270 of the sub-band module 20 to input high-speed data router port 307 connected to a DMA data buffer 308 of a respective FFT hyperchannelizer 310. The FIFO data buffer 308 performs buffering for asynchronous data arrival and outputs complex time domain data to its corresponding respective Fast Fourier Transform (FFT) device 310.

The FFT device 310 comprises one or more plurality of FFT engines (FFT1–FFT3) producing complex spectra that are overlapped in time. In the present embodiment, the FFT device 310 may select complex transforms 2^N in size. Unlike conventional FFT processes, the FFT device 310 is configured to perform no spectral windowing. For illustration, an 8k FFT results in a spectral data bandwidth of approximately 330 Hz that is 10% the bandwidth of expected signals. The object of the FFT device 310 is to channelize time domain data into complex spectral components that are much narrower than any signal of interest bandwidth. This is referred to as hyperchannelization. The output of the FFT device 310 is connected to a respective DMA buffer 330 for asynchronous output to high-speed data router port 370 for distribution to a respective spectral detection device or other signal processing module. In another embodiment of the invention, if a multichannel antenna or multichannel source data is present, the output of the FFT device 310 buffered by DMA buffer 330 may also be routed via the high-speed data router port 370 to a direction finding module. In still further embodiments of the invention, the output of the FFT device 310 buffered by DMA buffer 330 may be routed via the high-speed data router port 370 to any other signal processing module with respective high-speed data router port input means.

Referring to FIG. 2a and FIG. 2b each FFT channelizer 310 comprises an input high-speed data port 307 and DMA buffer 308 connected to the FFT device 310 composed of three parallel FFT engines FFT1–FFT3, with complex spectral output collected by DMA buffer 330 and distributed by a high-speed data router port 370. The high-speed data router port 370 is connected to a respective high-speed data router port 407' of first channel processor 410' of signal processing module 40, and if configured by the high-speed data router, to a second high-speed data router port channel processor 407". If the data router 370 of the channelizer module 30 configures both first and second channel processors, the first channel processor 410☐ receives the upper half of FFT channelizer complex spectra segments outputted from a corresponding FFT channelizer 310, while the second channel processor 410" receives the lower half of the FFT channelizer complex spectra segments.

Referring to FIG. 3, representative channel processor 410' incorporates a real-time controller 413', a complex spectra variable delay First-In-Tap-Out (FITO) memory 412, a respective detection processor 414, and a respective plurality of demodulation processors 415 connected to respective DMA buffer 430' and high-speed data router port 470' for complex signal data output.

Each respective FFT unit 310 performs an N-point complex FFT transformation using a block of complex signal data contained in the DMA buffer 308. Referring to FIG. 2b, the operation of the three FFT units comprising FFT unit 310 is orchestrated in time such that there is an overlap in data used by the first and second FFT units, the second and third FFT units, and in a cyclic manner, the third and first FFT units. In the embodiment of the preferred invention, the overlap is 12.5 percent. However, the device is not limited to such specific overlap values, and other overlaps such as 25 percent may be used.

The cyclic output of the three FFT engines FFT-1, FFT-2, FFT-3 that comprise FFT unit 310 is collectively buffered in a demand access memory (DMA) buffer 330 for asynchronous access by a high-speed data router port 370.

In the embodiment of the preferred invention, high-speed data routing links may be configured in a one-to-one or one-to-many arrangement from an N plurality of FFT channelizers to a P plurality of channel processors. When configured for one-to-one links between respective FFT channelizers 310 and channel processors 410, all FFT channelizer complex channel spectral segment outputs are transferred by the high-speed data router port 370 to respective channel processors high-speed data router port 407. When configured, for example, for one-to-a plurality of links between one FFT channelizer and a plurality of channel processors, in the embodiment of the preferred invention, two channel processors are employed. In such an arrangement, the respective first channel processor 410' receives by means of the high-speed data router port 407' the complex spectral segments output from the upper half of the respective FFT channelizer 310 and the respective second channel processor 410" receives by means of the high-speed data router port 407" the complex spectral segments output from the lower half of the respective FFT channelizer 310.

Channel Processor

Figure 4:
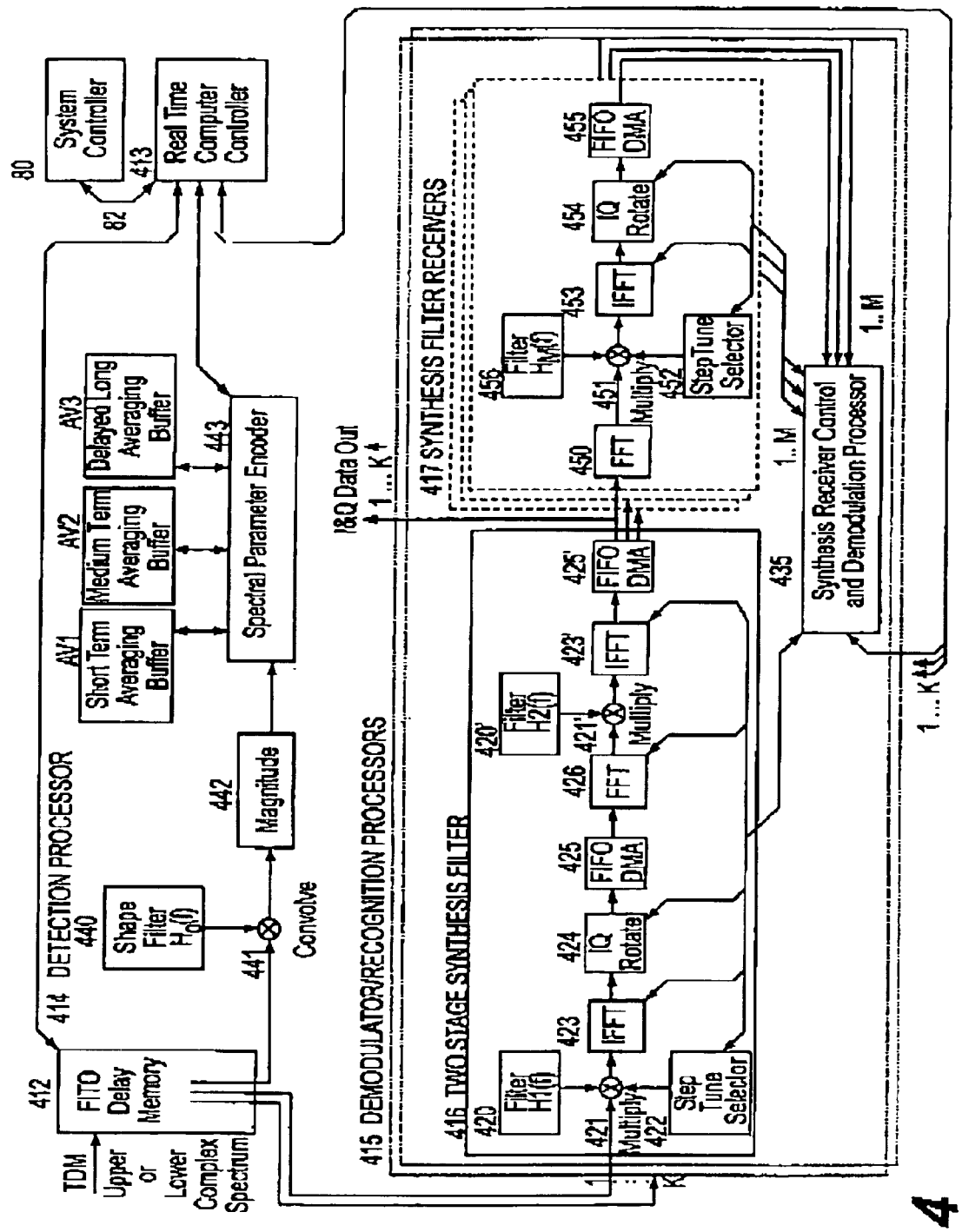
FIG. 4 diagrammatically illustrates a respective detection processor 414 and respective one demodulation/recognition processor 415 comprising two-stage synthesis filter 416 and plurality of synthesis filter receivers 417 under control of synthesis control and demodulation processor 435 according to the present invention.

Referring to FIGS. 3 and 4, each respective channel processor 410 incorporates a variable First-In-Tap-Out (FITO) delay memory 412 to receive complex spectral data from input high-speed data router port 407. FITO delay memory is connected to a detection processor 414 and to a plurality of demodulation/recognition processors 415 under control of a real-time controller 413 connected to the system controller 80. The detection processor 414 is composed of a shape filter 440, a convolution combiner 441, a spectral segment squaring component 442, a spectral parameter encoder 443 a short term average buffer AV1, a medium term average buffer AV2, and a delayed long term average buffer AV3.

In general, the detection processor 414 conducts spectral convolution of a signal inputted from the delay memory 412. The spectral parameter encoder 443 of the detection processor, in the presence of new signal energy within the resolution bandwidth of the FITO spectral segments, compares the three running averages stored in the buffers AV1–AV3, determines the onset of specified signal types as detected by the shape of a plurality of spectral segments and outputs a parameter word containing signal type, frequency, time, and bandwidth to the real-time controller 413.

The real-time controller activates (that is, spawns) the signal demodulation/recognition processors 415 in response to each new signal parameter word. Each demodulation/recognition processor 415 is dynamically connected to the FITO delay memory 412 to receive the complex spectral data at the start of signal presence.

The demodulation/recognition processor 415 includes at least a two-stage synthesis filter operation employing a first stage synthesis filter comprising band filter 420 and multiplier 421 circuit with a first offset step tune selector 422, a first inverse FFT (IFFT) device 423, a first In-Phase and Quadrature (I&Q) signal component rotation compensator 424 for tuning, and a first FIFO DMA buffer 425 for asynchronous output to second stage synthesis filter. First stage synthesis filter is connected to a second stage synthesis filter comprising FFT device 426, a second filter 420', a second multiplier 421' providing complex spectral data output to second IFFT device 423' and a second FIFO DMA buffer 425' for asynchronous output.

A second plurality of synthesis filters 416' may be employed for further spectral refinement of the signal data. The output of the second FIFO DMA buffer 425' may be configured so as to be available for system storage (As illustrated, 425' is configured for data output to system storage via high speed data router pout 470). Refined complex time domain signal data output from the plurality of second FIFO DMA buffers 425' is connected to the synthesis receiver controller 434. Synthesis receiver controller 434 applies demodulated algorithms to collective refined complex time domain signal data and output is passed to the real-time controller 413 which passes output to system controller 80.

Specifically, the FITO delay memory 412 receives respective FFT channelizer complex spectral segment outputs by means of the high-speed data router 407. The FITO memory 412 acts in principle as a First-In-First-Out (FIFO) memory storage or delay device, with constant refresh of new data (first in) and constant drop of old data (first out) with respect to a determined memory storage allocation size. Unlike typical FIFO memory or delay devices, the FITO may be accessed at any relative memory point from the first data (that is, tapped out). This provides a variable delay storage access device, with delayed output ranging from no delay (accessed at first in), to incremental delay (accessed at memory points with delay increments equal to the data sampling), to maximum delay (accessed at first out, the last point in memory before data is dropped). The implementation of the FITO delay memory 412 can be constructed in linear or circular data structures as those skilled in the art of data programming would be able to discern.

The detection processor 414 accesses respective FFT channelizer complex spectral data at the first in (no delay) output point of the FITO memory 412. The detection processor 414 comprises the operations of spectral convolution by the shaping filter $H_\alpha(f)$ 440 and convolution combiner 441, and outputs complex spectra to the spectral magnitude converter 442 that outputs the spectral magnitude component to the parameter encoding 443. Parameter encoder 443 creates, maintains and evaluates short-term, medium-term, and delayed long-term spectral averages for each respective real spectral segment data. The object design of the shaping filter $H_\alpha(f)$ 440 is to use a convolution filter comprising only real values, thereby reducing the number of multiply and adds in the convolution process by a factor of two over a truly complex shaping filter.

More specifically, the convolution processes conducted by the shaping filter 440 and convolution combiner 441 embodies the process of spectral windowing, wherein complex spectral data is convolved with the Discrete Fourier Transform (DFT) of an N-term time-domain window function as exemplified, but not limited to, such window functions described by Gnathal, "Some Windows with Very Good Sidelobe Behavior", *IEEE Transactions on Acoustics, Speech, and Signal Processing*, Vol ASSP-29, No 1, February 1981. The number of non-zero DFT coefficients is 2N−1. In at least one embodiment of the present invention, N=4, creating a window function with maximum sidelobe level of −93 dB and a hyperchannel bandwidth of approximately twice that of the original respective hyperchannel. The spectral windowing process repeats convolution on respective time-decimated sequence of complex spectral data, producing a time-sequence of windowed hyperchannels.

The spectral magnitudes generated by the spectral magnitude squaring component 442 are maintained in running averages of three different lengths, designated the short-term, medium-term, and delayed long-term spectral averages for each respective real spectral segment in the buffers AV1–AV3. The determination of the lengths of time designating short, medium, and long are values established for the particular spectral environment, with values ranging from, but not limited to, milliseconds to seconds. The delayed long-term average is to be understood as an operation that employs a FIFO buffer before adding the spectral segment content to the running average.

The spectral parameter encoder 443 employs the three spectral averages for determining the presence of new signal activity and outputs a parameter word including frequency, time of start, bandwidth, and possible signal modulation type to the real-time channel processor controller 413 for activation of one or more demodulation/recognition processors 415. It is well known to skilled workers in the art of communication that various signal modulations have distinguishing spectral shapes (e.g. distinct peaks with spectral separation for Frequency Shift Key (FSK) modulation, and sine(x)/x spectral humps for Phase Shift Key (PSK) modulation, etc.).

In essence, in at least one embodiment of the invention, spectral averaging as conducted by the combination of the magnitude squaring component 442 and the spectral parameter encoder 443 involves receiving time-sequence windowed hyperchannels, extracting the magnitude component of each respective complex hyperchannel spectral value and passes respective magnitude to three simultaneous finite impulse response (FIR) lowpass filter and decimation devices. In this case, the FIR devices are embodied by the buffers AV1–AV3. As noted above, these FIR devices produce the respective short-term, medium-term, and delayed long-term moving averages (STA, MTA, and DLTA) of spectra magnitude. In a preferred embodiment, the spectral average data from the buffers AV1–AV3 are then output to high-speed data routing device (not shown) to, for example, a visual display device for a real-time spectral display.

In an alternative embodiment, infinite impulse response (IIR) filters may be used to generate the STA, MTA, and DLTA of the buffers AV1–AV3. A typical one-pole filter computes the Nth output value as a weighted average of the Nth input and the N−1 average using the recursive algorithm:

$$\text{Average}(N) = \alpha \times \text{Spectra}(N) + (1-\alpha) \times \text{Average}(N-1), \text{ where } \alpha < 1$$

The constant $\alpha$ controls the attack and decay characteristics of the filter. Respective alphas are selected for respective short term, medium term, and long term IIR filters.

The plurality of demodulation/recognition processors 415 each access a respective one of the FFT channelizer complex spectral data at output points in the FITO memory 412 receiving a delayed data stream in such a manner that the complex spectral data received from the FITO memory 412 starts at the beginning presence of a detected signal energy. The demodulation/recognition processors 415 each comprise the operations of synthesis filtering by a two-stage overlap and add filter using only complex multiplies, and a plurality of software digital receivers in one or more cascaded stages under control of a real time demodulation processor.

Specifically, the synthesis filtering is accomplished by receiving complex spectral segment data from the output of the FITO memory 412 and providing two stages of filtering using the first spectral band filter $H1(f)$ 420 employing the first offset multiplier 421 of spectral segment as a means of filter tuning 422 under control of the synthesis receiver controller and demodulation processor 435, the first inverse FFT (IFFT) 423 for returning the complex spectra to the complex time-domain followed by a first phase rotation (I&Q rotate) via the signal component rotation compensator 424 to restore phase distortion incurred in the first filter and first IFFT transformation due to received FFT time-overlapped channelizer data and first filter offset tuning, and the FIFO DMA buffer 425 for output distribution.

Figure 5:
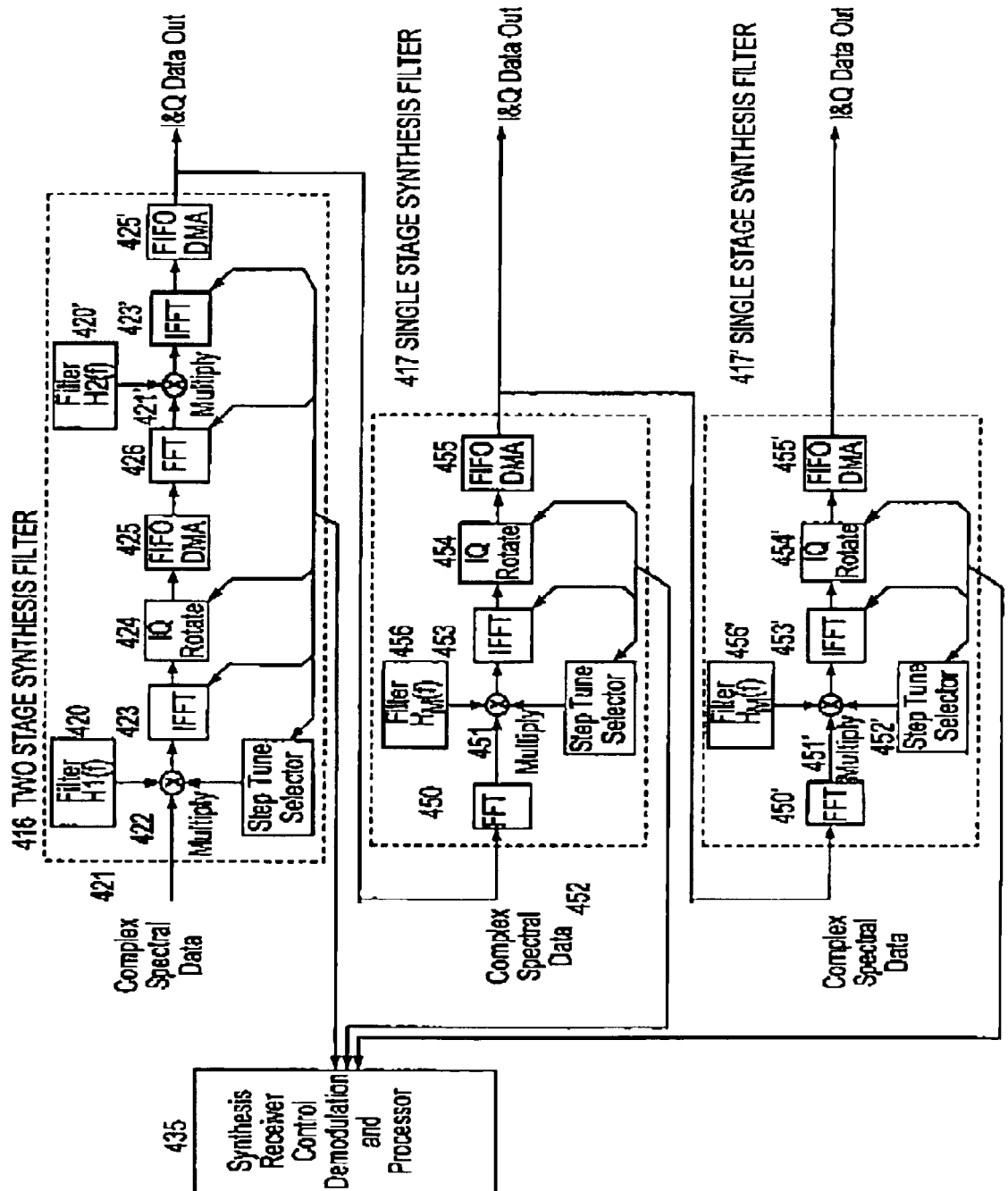
FIG. 5 diagrammatically illustrates a variation of the arrangement of synthesis filters in cascading stages according to the present invention wherein first tier of filtering is implemented by two-stage filter 416 connected to cascading series of single synthesis filters 417.

The single stage synthesis filter, commonly known to those skilled in the art of digital signal processing as an overlap and add filter, is exemplified in *Theory and Application of Digital Signal Processing*, L. R. Rabiner & B. Gold, Prentice-Hall, 1975, pp 65–66. The embodiment of the present invention is unique, however, in that a second stage is subsequently employed for increased dynamic range. The complex time domain output of the first synthesis filter stage is connected to a second stage, employing the operations the second FFT device 426 (the first being the FFT based channelizer producing the time overlapped complex spectra output to the channel processor and distributed to the demodulation processor by means of the variable delay FITO memory 412), the second multiplying spectral filter $H2(f)$ 420' by means of second multiply device 421', Output from second stage multiply device 421' is received by second stage IFFT device 423' and connected to second stage FIFO DMA buffer 425' for output distribution to a plurality of synthesis filters receivers 417. Two stage synthesis filter 416 and plurality of synthesis filter receivers 417 are under parametric control of the synthesis receiver control and demodulation processor 435 that receives direction from and passes parameters to the real time computer controller 413. Additional stages of refinement may be employed in the present invention. Referring to FIG. 5, a preferred embodiment of the invention employs additional synthesis filter modules in a cascaded fashion.

The plurality of software synthesis filters 417 connect to the synthesis receiver control and demodulation processor 435 to perform signal demodulation. In the embodiment of the preferred invention, three or more software digital synthesis filters may be simultaneously employed. It is to be noted that for most communication purposes, the bandwidth of the receiving digital filter matches the bandwidth of the wideband FFT channelizer. Whereas for this present invention, the software digital filters 417 may act upon a signal that is either wider than or narrower than a single respective wideband FFT channelizer segment. A respective software digital filter 417 receives complex time domain output from the second FIFO DMA buffer 425' and performs the operations of tune and filtering in the complex frequency domain.

Therefore, each software synthesis receiver employs a respective FFT device 450, a respective filter Hm(f) 456, a respective step tune selector 452 employing offset indices for multiplier device 451 that multiplies filter weights of filter Hm(f) 456 and spectral domain data from FFT device 450 and outputs filtered and tuned data to IFFT device 453 returning to the time domain. Data is output to respective I&Q phase rotation device 454 to compensate for step tune phasing and connected to FIFO DMA buffer 455 for output. Respective two stage synthesis filter 416 and plurality of synthesis filter receivers 417 are under control of the synthesis receiver control and demodulator processor 435.

The synthesis receiver controller 435 activates, and controls two-stage synthesis filter 416 and activates, controls, and receives the output from one or more of the plurality of software synthesis receiver filters 417, performing signal demodulation in accordance with control instructions received from the real time controller 413.

Data Buffering Device

The demand memory access buffer 230, 330, 425, 425', 434 and the demand memory access buffer 412 are implemented as data buffering devices designed to receive synchronous or asynchronous data input such as from a previous module high-speed data router device. For efficiency, some modules of the system can be configured to share a common data buffering device when the data source for each of that module's components are the same. In general, these data buffering devices comprise a memory storage means such as computer processor RAM, cache, or other dedicated computer memory. These data buffer device are formed to index memory by First In First Out (FIFO) means, First In Tap Out (FITO) means, or data decimation means to provide asynchronous data output according to demand of the respective module digital processing device. Data may be input to and/or output from the buffering device as individual data or data blocks of various size. The same data may be asynchronously and/or time delay outputted to respective receiving modules. The output of the buffering device may represent time-domain data samples, time-decimated data samples, frequency-domain spectra data, or parameters domain data (for example angle-of-arrival data per hyperchannel). The data buffering device may also provide selectable data indexing for data decimation wherein output data represents every mth data element.

High-Speed Data Router Device

The high-speed data router 70 (not shown) is comprised in part as disclosed above with one to one, one to many, and many to one data router ports (DRP), exemplified by DRP 270 connected to plurality DRP 307, plurality DRP 370 connected to 407, as disclosed above, are used to distribute the output of the respective digital processor devices in which they are incorporated. As disclosed for the preferred described above, the data router port 270 is incorporated in the sub-band module 20 to output decimated wideband receiver data, while the data router port 307 is used to input respective data to the channelizer module 30. In similar fashion, the plurality of data router ports 370 of channelizer module 30 output data to plurality of data router ports 407 of signal processor module 40. In the embodiment of the present invention high-speed data output may be directed to another digital processing module, to a logging or archiving device, to a recording device, to a display device, or to other unspecified function device or module. Recursive routing of output data to input of same respective module may be performed. High-speed data routing is defined as the device capability to transfer data from one module to another without sustained and increasing backlog of data waiting to be transferred.

High-speed data routing occurs at transfer rates substantially higher than the collective data rates or subsequent module output data rates. In one embodiment of the present invention, a commercial high-speed RACEway Interlink may be used to interconnect selected digital signal processing modules. The transfer route of data is configurable by the system controller 80 that is connected to the high-speed data router controller 70 (not shown) and to respective DRPs by the system control bus 82 (e.g. VMEbus).

Transferred data may have various forms such as complex value in-phase and quadrature (I&Q) time domain data, complex value spectral data, baseband or audio sample data, demodulated signal data, binary or symbol text data, or subsequent module notification data, such as signal activity frequency and bandwidth, from the detection processors 410, 410', 410" carried to respective demodulation/recognition processors 415, 415', 415".

System Controller

The system controller 80 is implemented in at least one embodiment using a VME control computer using such real time operating systems as VxWorks. The primary function of the system controller 80 is to coordinate module functions. The control function provides the overall set-up, coordination, management, and monitoring of the other system functions. Control sets up the individual functions by initializing the processes, downloading appropriate software and configuring the functions with necessary parameters. These parameters are typically maintained in a database and include data such as bandwidths, resolutions, thresholds, function sequencing, tasking, and processing selection. Control provides the system coordination function by implementing the defined processing sequences. This management allows for flexibility to soft-route data flows between functions. Management allows for the load balancing, resetting, and communications between functions. By monitor the individual functions control performs health check functionality.

The real time controller 413, 413', 413" is implemented using embedded processors such as the Motorola G3 processor and respective native operating system to control on-board module processes such as detection. The real time controller 413, 413', 413" is responsible for spawning software modules such as signal recognition and demodulation and direction finding.

Signal Activity Detection

One variation to the detection processor 414, as shown in FIG. 4, involves the incorporation of a signal activity detection, the signal parameter encoder 443 that is connected to receive the moving average data from the buffers AV1–AV3 of the detection processor 414. As a further variation to the present invention, the use of the signal parameter encoder 443 includes the generation of a long-term moving average LTA via a buffer AV3, along with the STA, MTA and DLTA averages. The signal parameter encoder 443 incorporates a buffers AV1–AV3 that receives the STA, MTA, and LTA or DLTA hyperchannel averaged data. A signal activity comparator (not shown) within signal parameter encoder 443 compares the STA, MTA and LTA or DLTA of each hyperchannel for a number of averages and compares to a predetermined threshold value to determine whether signal activity is present. The onset of a signal stronger than the ambient noise creates a temporary discrepancy between said STA and the LTA or DLTA in one or more adjacent hyperchannels encompassing the bandwidth of the signal activity. The signal activity detection (not shown) within parameter encoder 443 characterizes time and amplitude of adjacent hyperchannels in the region surrounding a threshold excess. In operation, to mitigate the effects of pre-existing signals on the characterization of the new signal, the signal activity detection parameter encoder 443 examines the ratio of MTA/LTA or MTA/DLTA. In further variations of the invention, the detection processor 414 may be devised to generate the STA, MTA, LTA and DLTA, not just the three moving averages used in the first embodiment. The STA, MTA and LTA or DLTA may in turn be used in other detection algorithms known to those skilled in the art to determine regions of hyperchannel signal activity.

The signal activity detection parameter encoder device 443 alerts real-time controller 413 to spawn subsequent components or modules connected thereto to respond to detected and refine hyperchannel signal activity. Time, frequency and the number of hyperchannels (bandwidth) of signal activity exceeding predetermined thresholds may be distributed via high-speed routing devices (not shown) to such subsequent spawned processing modules for, as an example, synthesis, recognition, demodulation, and angle of arrival functions.

Signal Recognition

In the current embodiment of the invention, as shown in FIG. 3 and FIG. 4, channel processor 410 may be implemented using a plurality of dynamically allocated signal recognition devices 415, each respective signal recognition device comprising two-stage synthesis filter 416 and plurality of synthesis filter receivers 417. Two-stage synthesis filter 416 receives complex spectral data from FITO data buffering device 412 with a finite but variable delay tap of data. The FITO buffer 412 provides selected (decimated) complex hyperchannel data upon direction from a signal detection means, such as the signal detection device 414. Respective ones of the FITO buffer 412 may be configured to provide asynchronous data output to respective synthesis filter devices. It is to be understood that a plurality of synthesis filter devices may be spawned and controlled by a signal detection device to perform signal filtering on detected hyperchannel spectral activity using the same FITO memory or buffer data source.

A synthesis filter device as would be applicable to the invention is based on the conventionally-known overlap-save method of linear FIR filtering. The basic operations in the overlap-save method are: (1) compute an N-point FFT of a complex time domain signal; (2) multiply it by the frequency domain representation of a filter; (3) compute an N-point inverse FFT of the product. These operations result in a filtered time domain version of the original signal.

In the present invention, a number of significant changes to the basic overlap-save method are made. First, the data representation at the input of the two-stage synthesis filter 416 is a subset of FFT points of hyperchannel data originating from the N-point FFT device 310. Second, the multiply filter 420, 420' is comprised of real weight filter coefficients selected such that the filter product at multiply device 421 has 90 dB of attenuation at the band edge of the subset of FFT points and allows high signal fidelity to be achieved in the presence of strong (+80 dB) interference within the input bandwidth. Third, the multiply at 421 is offset in indices by step tune device 422. The shift caused by 422 effectively tunes the filter. The tuning step not only offsets the FFT data, but introduces a phase rotation. Respective tuned and filtered data is time domain transformed by inverse FFT (IFFT) 423. The resultant complex time domain data is contra-rotated by rotation device 424 to compensate for phase angle introduced by step tune device 422.

Another innovation of the present invention is the application of a second stage overlap-save operation to compute an N'-point FFT of a complex time domain signal; multiply it by the frequency domain representation of a filter; and return data to respective time domain data. FFT device 426 transforms time domain data received from FIFO 425 into complex spectral data that is multiplied by H2($f$) filter weights 420' in multiplier device 421'. Data from multiplier device 421' is transformed to time domain by IFFT device 423' and connected to FIFO DMA buffer 425' for asynchronous output. To get the overall bandwidth reduction typically needed in the HF radio spectrum (e.g. from 2.7 MHZ to 3 kHz), the present invention used two stages of overlap-save filtering as described above.

The invention provides significant processing efficiencies by the repeated application of this synthesis filtering in stages. For a 1000 to 1 bandwidth reduction, the present embodiment of the invention uses two stages of overlap-save synthesis filtering. In further embodiments or variations of the invention, multiple stages of synthesis filtering can be provided to attain the desired bandwidth reduction. Rotation of the overlapped data also causes a phase discontinuity at each output block boundary that is corrected before subsequent processing is performed. The process of cascading synthesis filters is illustrated in FIG. 5, employing two-stage synthesis filters 416 with respective time domain output received by synthesis filter 417. In like manner, time domain output of synthesis filter 417 is received by cascaded synthesis filter 417'. The cascade may continue for as many stages as necessary for data filtering, as exemplified by synthesis filter 417". At each cascade, complex time data may be output to digital recording means.

As disclosed above, the main embodiment of synthesis filtering done by the present invention performs two stages of synthesis filtering to convert time overlapped hyperchannels to time-domain data that more closely match the spectra of the detected signal activity of interest. The following illustrates the performance of the signal demodulation/recognition processor of the present invention in connection with the use of a signal detection device.

The signal detection device 414 alerts real-time computer 413 of signal activity in 11 adjacent hyperchannels out of an 8192-point FFT from hyperchannelizer FFT 310. Real-time computer 413 spawns demodulation/recognition processor 415 comprised of synthesis filter components. The signal synthesis components of the demodulation/recognition processor 415 receive 128-points of spectral signal activity encompassing the 11 adjacent hyperchannels of signal activity from FITO delay buffer 412 corresponding to a narrowband signal detection event. First stage of two-stage synthesis filter component 416 receives the delayed FITO buffer data of surrounding signal activity of 128 hyperchannels. At first stage of the synthesis filtering 416, step tune selector 422 changes indices to represent center 11 hyperchannels of signal activity as zero Hz and then performs a multiply by filter weights 420 representing a passband of 5 kHz and a stopband (−90 dB) of 42 kHz. The synthesis filtering then performs a 128 point Inverse FFT (IFFT). The output of this first stage of synthesis filtering decimates the data rate by 64 (8192 point FFT/128 point IFFT). A second stage synthesis filtering performs 1024 point FFT overlapped by 25% at FFT device 426. The center 256 frequency channels are multiplied by filter weights 420' representing a passband of 5 kHz and a stopband (−90 dB) of 6 kHz, followed by a 256 point IFFT. The output of this second stage of synthesis filtering decimates the data rate by 4 (1024 point FFT/256 point IFFT) to a final complex rate of 10546.875. The synthesis filtering components then output time-domain data to a plurality of synthesis filter receivers 417 for refined signal data to the demodulation processor 435.

The filters described in the synthesis processing are typically pre-computed and stored in a library. Different bandwidth processing may occur on the same initial FFT data simultaneously. For instance, in addition to the 5 kHz bandwidth filter described, a simultaneous two-stage 50 kHz synthesis filter may be instantiated. The first stage of this 50 kHz synthesis filter processing would use a passband filter of 50 kHz and a stopband of 84 kHz, followed by a 256 IFFT. The second stage synthesis filter would then consist of a 512 point FFT overlapped by 12.5%. The second stage filter would have a passband of 50 kHz and a 90 dB stopband of 56 kHz and final 512 point IFFT.

Synthesis Receiver Control and Demodulation Processor

The synthesis receiver control and demodulation processor 435 receives a decimated and synthesis filtered data stream from the synthesis filter components 417 of the demodulation/recognition processor 415.

The processor, as shown in FIG. 4, incorporates a signal recognition data buffer 425' that provides the data stream to a plurality of signal synthesis filter receiver devices 417 that performs filtering in a manner similar to a synthesis filter module. To continue illustration of the current embodiment responding to a detection event of 11 hyperchannels, the signal recognition device receives the 10546.875 Hz sample rate data center tuned to the frequency of signal activity. The signal synthesis filter receiver performs a 512 point, 25% overlapped FFT and convolves with the three non-zero coefficients of the DFT of a Hann window. A resolution of about 40 Hz is thereby achieved. The original hyperchannel signal activity is thus resolved into spectral components.

In addition, the signal synthesis filter control and demodulation processor 435 makes a run-time decision about the need for additional filtering. As a typical example, given two spectral components indicating a Frequency Shift Key (FSK) signal, the synthesis filter control and demodulation processor applies three simultaneous single stage synthesis filters 417 one on each individual spectral components and one on the total apparent signal of interest bandwidth. The criteria for the number, placement, and span of synthesis filters in the hyperchannelized data is maintained in a controlling database (not shown) and initiated by detection processor 414 through real-time computer controller 413 to synthesis receiver control and demodulation processor 435.

The synthesis receiver control and demodulation processor 435 applies multiple and simultaneous signal demodulations to the time domain data output from plurality of synthesis filter receivers 417. The algorithm performs multiple and simultaneous demodulations based on different signal modulation types and keying speed. Synthesis receiver control and demodulation processor 435 performs single-channel amplitude, frequency, or phase demodulation by generic algorithms in conjunction with a database of signal demodulation criteria. The criteria may be varied to control probability of correct signal identification and probability of false alarm.

In another variation of the invention, the synthesis receiver control and demodulation processor 435 makes a run-time decision that a signal is compound modulated, such as by frequency modulated frequency division multiplexing (FM/FDM) of narrowband telephony circuits. To accomplish this, the signal recognition processor performs FM demodulation on the output of the first synthesis filtering. First synthesis filter bandwidth is examined by synthesis receiver control and demodulation processor 435 and determines that, for example, 12 or more narrowband frequency division multiplexed signal channels could be further demodulated. synthesis filter control and demodulation processor 435 then subsequently applies 12 simultaneous single stage synthesis filters 417, one per channel. The digital output from respective synthesis filters are received by synthesis filter control and demodulation processor 435 and applies generic algorithms in conjunction with a database of signal demodulation criteria and performs single-channel amplitude, frequency, or phase modulation. The criteria may be varied to control probability of correct signal identification and probability of false alarm.

N-Channel Direction Finding

It is to be understood that the present invention may employ wideband data from a plurality of antennas or sensor and receive multiple respective wideband data. Wideband data may be received from a set of N spatially separated or phase orthogonal antennas or sensors, and as is common for such multi-antenna devices, the respective multiple of wideband receivers are coherently phase locked and ADCs are time synchronized.

Figure 6:
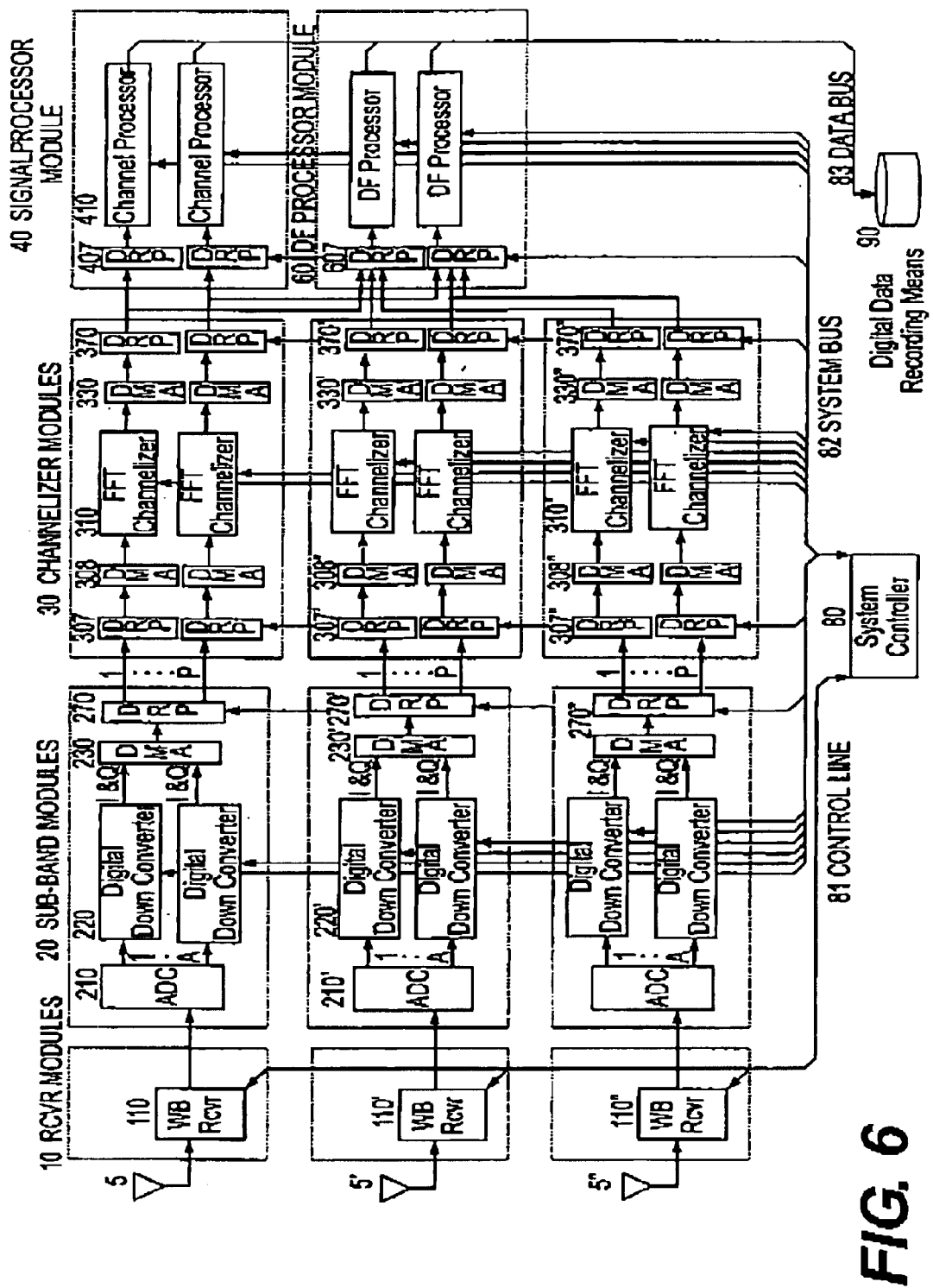
FIG. 6 diagrammatically illustrates N-sensor embodiment of invention to perform signal demodulation, recognition, and direction finding. First channel sensor 5 comprises first channel receiver module 10 and processing chain of respective first channel sub-band decimation module 20, channelizer module 30, and signal processor module 40. Remaining plurality of sensors comprise a similar plurality of respective receiver modules 10' ... 10", sub-band decimation modules 20' ... 20", and channelizer modules 30' ... 30". Collective first channel and remaining sensor channels of channelized data is collectively received by DF processing module 60 comprising DF processors 610 for respective sub-band decimated channels of each collective N-sensors and output data parameters to data bus 83 to recording means 90.

In accordance with a second embodiment of the invention, as illustrated in FIG. 6 for three spatially separated or phase orthogonal antennas or sensors 5, 5', 5", connected to a respective plurality of multiple wideband receivers 110, 110', 110" that have coherently phase locked oscillators (not shown) and output coherently phased signal data to sub-band decimation module 20 that receives respective time domain analog signals and converts respective sensor signals into complex digital data outputs from a plurality of multiple of wideband ADCs 210, 210', 210". In this embodiment of the invention, six decimated complex digital sub-band data streams are output from each respective antenna or sensor source wideband ADC. FIG. 6 illustrates this respective plurality of sub-band data streams exemplified by two sub-band decimation devices 220 with I&Q time domain output of respective sensor 5. In similar fashion, two sub-band decimation 220' and 220" outputs of respective sensor 5' and 5" are illustrated.

The plurality of multiple wideband decimation outputs 270, 270', 270" are distributed to a respective plurality of FFT hyperchannelization modules 310, 310', 310", connected to respective FIFO DMA buffer devices 330, 330', 330" and output distributed by high-speed data router ports 370, 370', 370".

The object of the FFT devices 310, 310', 310" is to channelize respective N-sensor time domain data into complex spectral components that are much narrower than any signal of interest bandwidth. FFT data from respective antenna or sensor multichannels are time synchronized.

In this second embodiment of the invention, a first channel of FFT hyper channelized data 370 provides input to the spectral detection circuit 414 of first channel processor 410 by means of data router port 407. Upon detection of signal activity, the spectral detection circuit spawns the operation of a demodulation recognition processor 415 comprising synthesis filter 416, a plurality of simultaneous synthesis filter receivers 417 whose respective time domain signal output is demodulated by synthesis receiver control and demodulation processor 435 similar to those used in the first embodiment of the invention. With N multichannel antenna or sensor source FFT hyperchannel data, the spectral detection circuit 414 of first channel processor 410 may also spawn a direction finding processes within direction finding module 60.

Figure 8A:
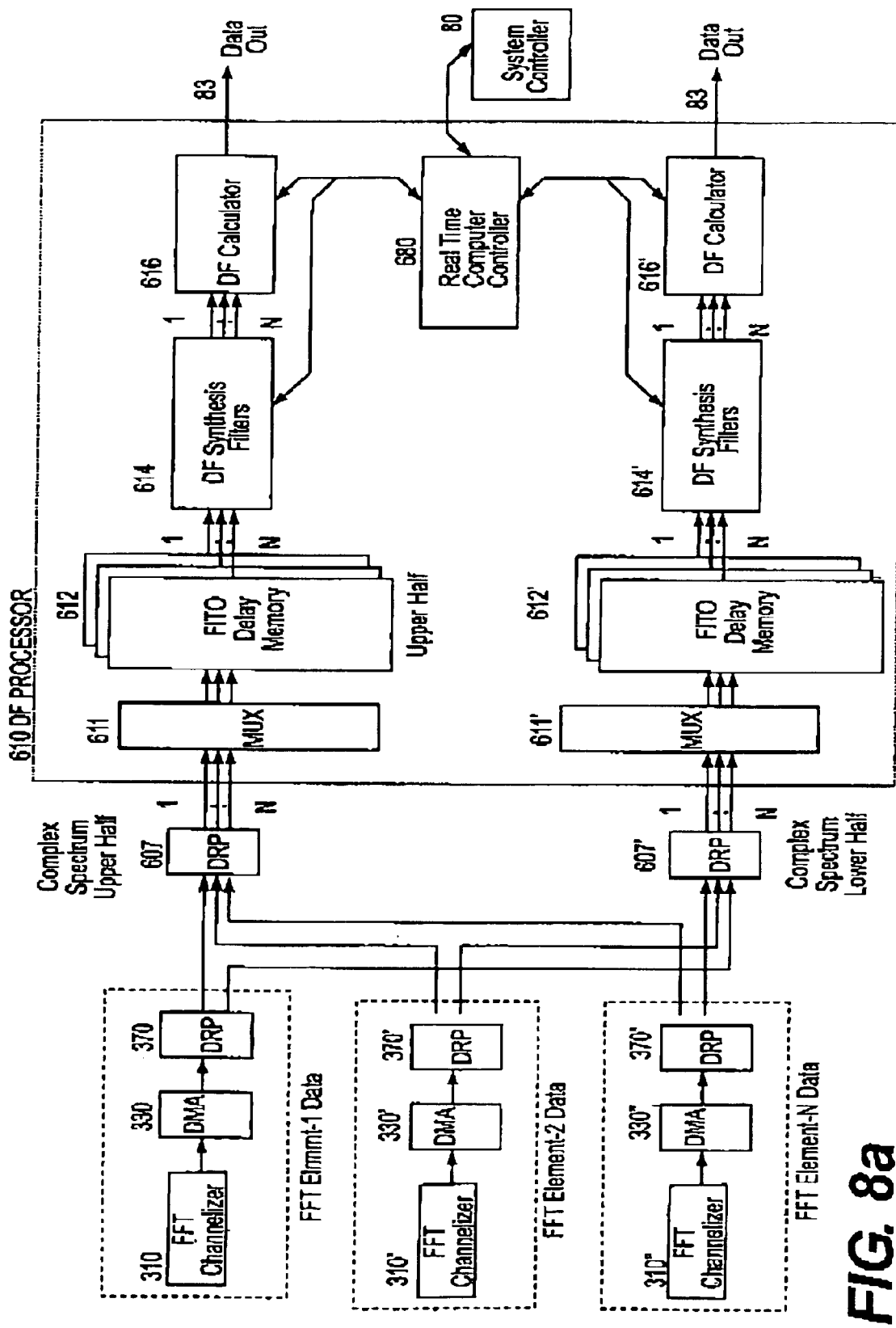
FIG. 8*a* illustrates a variation of the DF processor of present invention for receiving N-sensor hyperchannel spectral input. DF processor comprises multiplexer 611, 611' for receiving upper and lower spectral half data and connected to respective First In Tap Out (FITO) delay memory buffers for collective output to respective DF synthesis filters 614, 614', that filter and transform hyperchannel spectral data for collective output to respective DF calculators 616, 616' and angle of arrival output to system data bus 83.

One implementation of the direction finding module 60 involves the use of the N-Channel Direction Finding technique. Referring to FIGS. 6 and 8a, DF processor module 60 comprises a plurality of input data router ports 607 and 607', receiving upper and lower half hyperchannelized data from respective decimated sub-band of N-sensor channel processors. Decimated sub-band hyperchannelized data of N-sensor channel processors from respective data router ports 607 and 607' are collectively connected to respective DF Processor 610. DF Processor 610 comprises respective upper and lower hyperchannel data multiplexers (MUX) 611, 611' connected to respective plurality FITO delay memory buffers 612, 612'. In response to detected signal activity by detection processor 414, respective N-sensor hyperchannel data of FITO delay memory buffers is output to respective spawned N-sensor band DF two-stage synthesis filters 614, 614'. Filtered N-sensor upper and lower half hyperchannelized data is transformed by respective DF two-stage synthesis filters 614, 614' to time-domain data and output to respective spawned upper and lower half hyperchannel DF calculators 616, 616' to perform angle of arrival calculation. DF calculators 616, 616' calculate angle of arrival of signal using N-sensor collective time domain data by phase comparison algorithms known to those skilled in the art. Calculated angle of arrival parameter is output to data bus 83.

N-Channel Multiplex

N-sensor FFT channel processors 310, 310', 310" is distributed by high-speed data router and FIFO buffers to upper half and lower half N-sensor data multiplex devices 611, 611' of DF processor 610. It is to be understood that the hyperchannel complex spectral data corresponding to the upper half spectral data of respective sub-band decimation FFT channel processor of each respective sensor is collectively received by upper half multiplexer 611. Respective hyperchannel complex spectral data corresponding to the lower half spectral data of respective sub-band decimation FFT channel processor of each respective sensor is collectively received by lower half multiplex 611'.

Figure 10A:
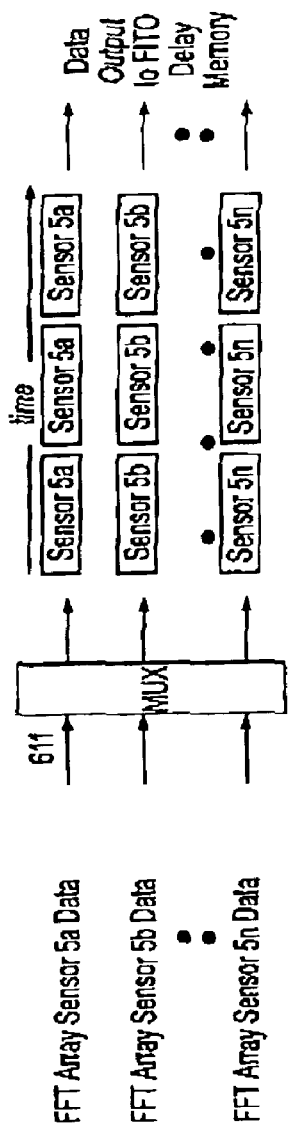
FIG. 10*a* illustrates data flow through N-sensor multiplexer 611 of DF processor 610 and Beamform processor 690. Respective hyperchannel data from each N-sensor FFT hyperchannelizer (upper or lower spectral half) is received by respective multiplexer 611 by means of high speed data router and ports (not shown). Multiplexer orders respective hyperchannel data from respective N-sensors to respective FITO delay memory buffer.

As an example, a 4-sensor system comprises four respective wideband receivers 110 output to four respective ADCs 210. Each respective ADC 310 outputs to six sub-band digital down converters 220. Time domain data from plurality of 24 digital down converters 220 is routed by high-speed data router to respective plurality of 24 FFT channelizers 310 transforming data into hyperchannel complex spectral data that is output and distributed by high-speed data router to respective six upper half multiplexers 611 and to respective six lower half multiplexers 611', wherein each multiplexer receives respective sub-band decimated hyperchannel data from each of the four sensors. Referring to FIG. 10a, respective multiplexer device receives hyperchannel complex spectral data from N-sensor FFT channelizers and outputs N-sensor data streams to respective FIFO delay memory data buffers.

DF Synthesis Filter

Figure 9A:
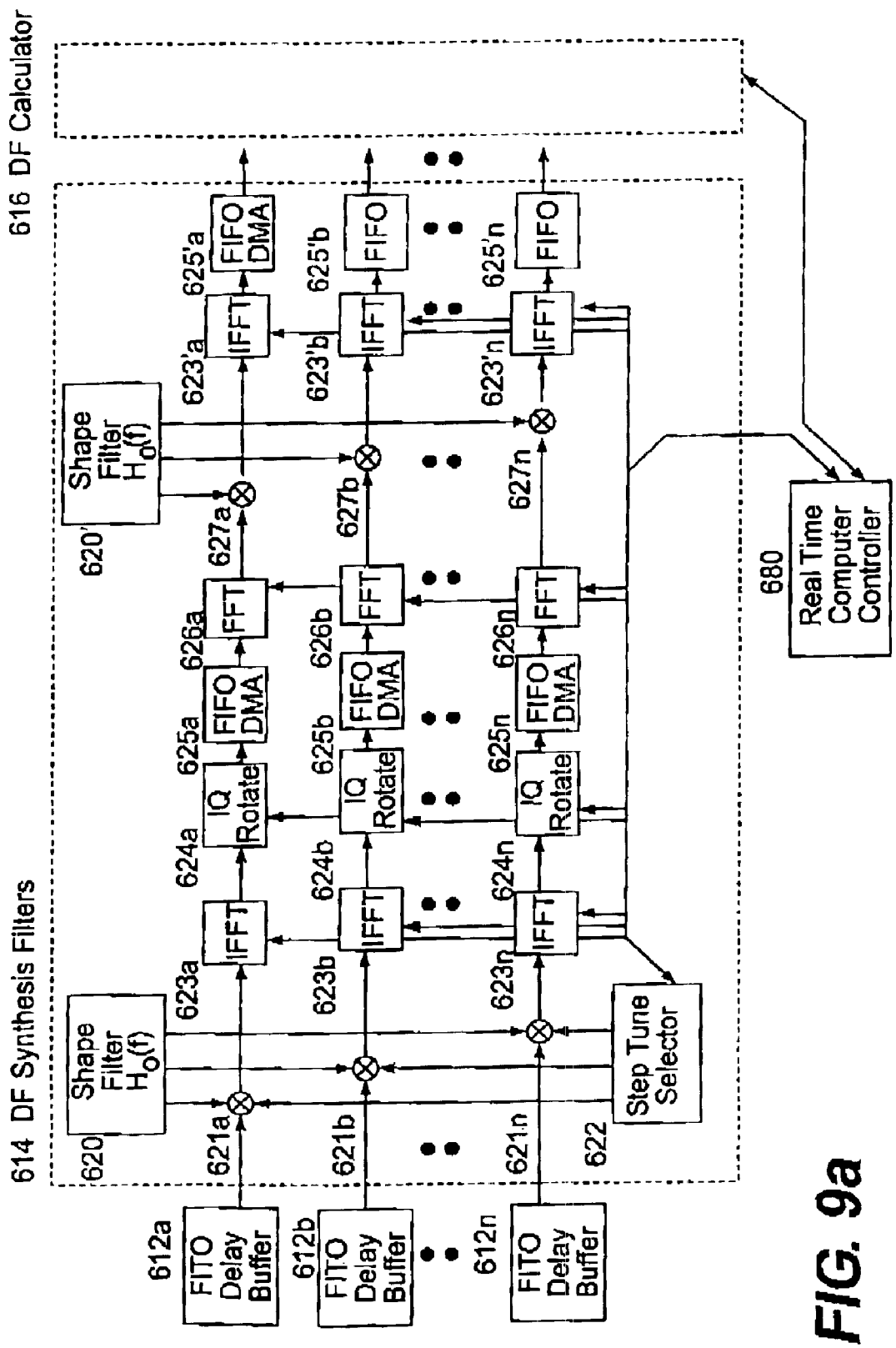
FIG. 9*a* illustrates an N-sensor two-stage DF synthesis filter 414 comprising first stage multipliers 621*a* to 621*n* receiving hyperchannel data from respective FITO buffers 612*a* to 612*n* and multiplying input by common filter weight 620 with common shifted indices set by step tune selector 622 output to respective first stage inverse FFT devices 623*a* to 623*n*. Inverse FFT devices are 623*a* to 623*n* are connected to respective contra-phase I&Q rotation devices 624*a* to 624*n* with output to respective first stage FIFO buffers 625*a* to 625*n*. Second stage respective FFT devices 626*a* to 626*n* receive output from respective first stage FIFO buffers 625*a* to 625*n* and in manner similar to first stage are filtered by respective multipliers 627*a* to 627*n* with common filter weights 620'. Respective hyperchannel products are inverse transformed by respective FFT devices 623'*a* to 623'*n* connected to respective FIFO buffers 625'*a* to 625'*n* for output.

The multichannel DF synthesis filter 614 performs N-sensor simultaneous synthesis filtering on a common respective subset of hyperchannels that are centered on the hyperchannel of first channel detected signal activity. In the present embodiment of the invention, two-stage synthesis filtering is used in a manner similar to the first channel synthesis filter. Respective synthesis filters perform identical bandwidth filtering and provide N multichannel filtered time domain outputs of detected signal activity. Referring to FIG. 9a, N-sensor hyperspectral data output from plurality of FITO delay memory buffers 612a, 612b, . . . 612n is received by respective first stage multiple synthesis filter multiplier devices 621a, 621b, . . . 621n of spawned DF two-stage synthesis filter 614. Respective multipliers multiply hyperchannelized spectral data with common frequency-domain filter coefficient Ho(f) table 620 using common step-tune selector offset indices 622. In manner similar to first stage synthesis filter 416, frequency filtered hyperchannel data from multiplier devices 621a, 621b, . . . 621n are output to respective inverse FFT devices 623a, 623b, . . . 623n connected to respective contra-rotating phase rotation devices 624a, 624b, . . . 624n connected to respective FIFO DMA buffers 625a, 625b, . . . 625n for asynchronous output respective second stage filters. FIFO DMA buffers 625a, 625b, . . . 625n output time-domain data to respective FFT devices 626a, 626b, . . . 626n that transform N-sensor data back to complex spectral data and output to respective second stage multiplier devices 627a, 627b, . . . 627n multiplying respective data by common second stage filter coefficients Ho'(f) 620'. In manner similar to first stage of multiple N-sensor synthesis filters, multiplier devices 627a, 627b, . . . 627n output is received by respective inverse FFT devices 623a', 623b', . . . 623n' that transform complex spectral data back to time-domain data received by respective FIFO DMA buffers 625a', 625b', . . . 625n' for asynchronous output of N-sensor tuned and filtered time-domain data.

DF Calculator

The DF angle of arrival calculation device 616 receives sensor time domain data for calculating an angle of arrival (AOA). As will be evident to those skilled in the art of direction finding, any of a number of commonly known phase and amplitude N sensor comparison algorithms may be employed by the DF angle of arrival calculation device 616 of the present invention. For example, in this second embodiment of the invention, an angle of arrival calculation device 616 would be able to accommodate 2-channel commutated direction finding calculation, 3-channel comparative direction finding calculation, as well as any of a set of commonly known N multichannel comparison algorithms.

3-Channel Comparative DF Module

A further implementation of the direction finding embodiment uses the 3-Channel Comparative DF technique. In this implementation, referring again to FIG. 6, three sensors are employed: reference antenna 5, sine-phase antenna 5', and cosine-phase antenna 5" provide the RF or acoustic source.

A first channel reference source is received by the first wideband receiver 110 and ADC 210. The second and third channel sources are received, respective, by the second and third wideband receivers 110', 110" and ADCs 210', 210". The first, second, and third local oscillators of wideband receivers 110, 110', 110" are coherently phase locked and the corresponding ADCs 210, 210', 210" are time synchronized.

First, second, and third channel digital data are received by the respective wideband decimation modules 220, 220', 220" and respective FFT hyperchannelization modules 310, 310', 310". First channel hyperchannel data is received by first channel signal detection processor 414 of channel processor 410. The spectral detection processor 414 spawns the operation of the synthesis filtering module 415, comprising two-stage synthesis filter 416, a small plurality of synthesis filter receivers 416 and synthesis receiver control and demodulation processor 435. Concurrently, respective first, second and third channel hyperchannel data are received by 3-channel comparative DF processor 610.

Figure 8B:
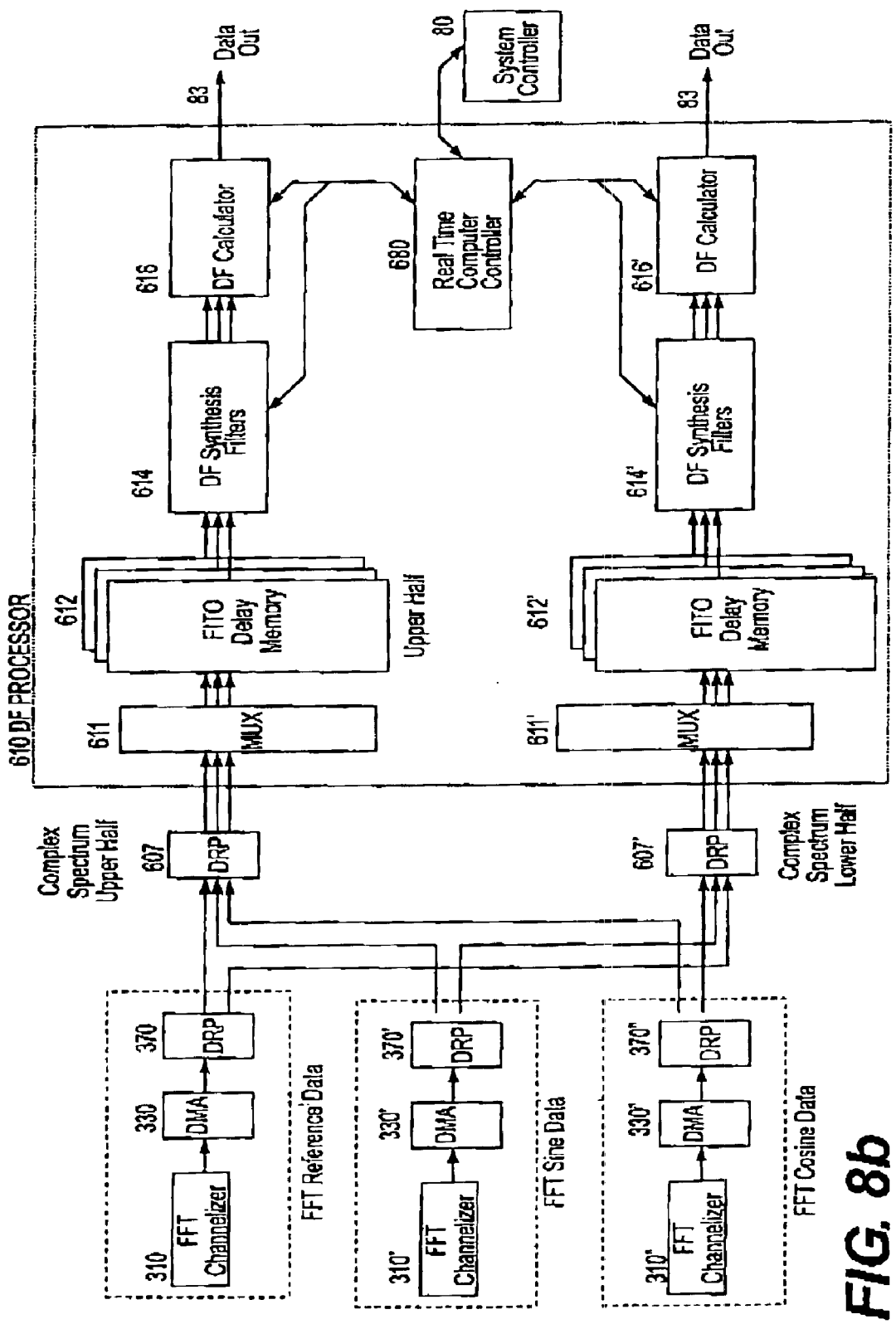
FIG. 8*b* illustrates a variation of the DF processor of present invention for receiving 3-Channel reference, spatial sine-phase, and spatial cosine-phase sensor data. DF processor comprises multiplexer 611, 611' for receiving upper and lower spectral half data and connected to respective First In Tap Out (FITO) delay memory buffers for collective output to respective DF synthesis filters 614, 614', filter and transform hyperchannel spectral data for collective output to respective DF calculators 616, 616' and angle of arrival output to system Data Bus 83. 3-Channel signal demodulation, recognition, and DF is an embodiment of the N-sensor embodiment of present invention of particular usefulness.
Figure 10B:
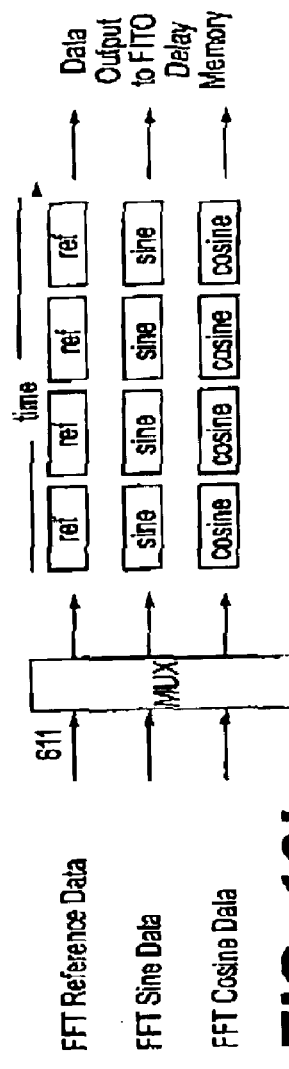
FIG. 10*b* illustrates data flow through 3-channel multiplexer 611 of DF processor 610. Respective hyperchannel data from reference, sine-phase, and cosine phase hyperchannel FFT hyperchannelizer (upper or lower spectral half) is received by respective multiplexer 611 by means of high speed data router and ports (not shown). Multiplexer orders respective hyperchannel data from respective reference, sine-phase, and cosine phase to respective FITO delay memory buffer.

Referring to FIG. 8b, upper and lower spectral half data of respective first, second, and third FFT hyperchannel data are received by respective multiplexer devices 611 and 611'. The three channels of data pass through the respective multiplexer as shown in FIG. 10b, representing a 3-sensor instantiation of an N-sensor data flow. Again referring to FIG. 8b, upper and lower half spectral data from multiplexer devices 611, 611' are output to respective two-stage DF synthesis filters 614, 614' that output three streams of identically filtered and transformed time domain data to respective DF calculators 616, 616'.

The multichannel two-stage DF synthesis filters 614, 614' performs three simultaneous synthesis filterings on respective reference, sine-phase and cosine-phase respective subsets of hyperchannels that are center tuned on the hyperchannel of first channel detected signal activity. In this 3-channel comparative DF implementation, two-stage synthesis filtering is used in a manner similar to first channel recognition synthesis filter. Respective synthesis filters perform identical bandwidth filtering and provide three filtered time domain output of detected signal activity for output to DF calculator 616, 616'.

In another variation of this implementation, additional synthesis filters may be incorporated to perform fine grain spectral filtering on the three comparative channel data based on the first channel synthesis filters of the signal recognition module 414.

An angle of arrival calculation device 616, 616' receives reference, sine-phase and cosine-phase time domain and filtered data of comparative sensor hyperchannels. As one of skill in the art would understand, amplitude and phase angle correlation, Watson-Watt amplitude, or other angle of arrival algorithms may be used to calculate the angle of arrival. Angle of arrival data is output to data bus 83.

2-Channel Commutated Direction Finding Module

With respect to the fourth embodiment of the invention, it is to be understood that the present invention is also capable of implementing specific multichannel direction finding (DF) algorithms. One such implementation involves the 2-Channel Commutated DF technique.

Figure 7:
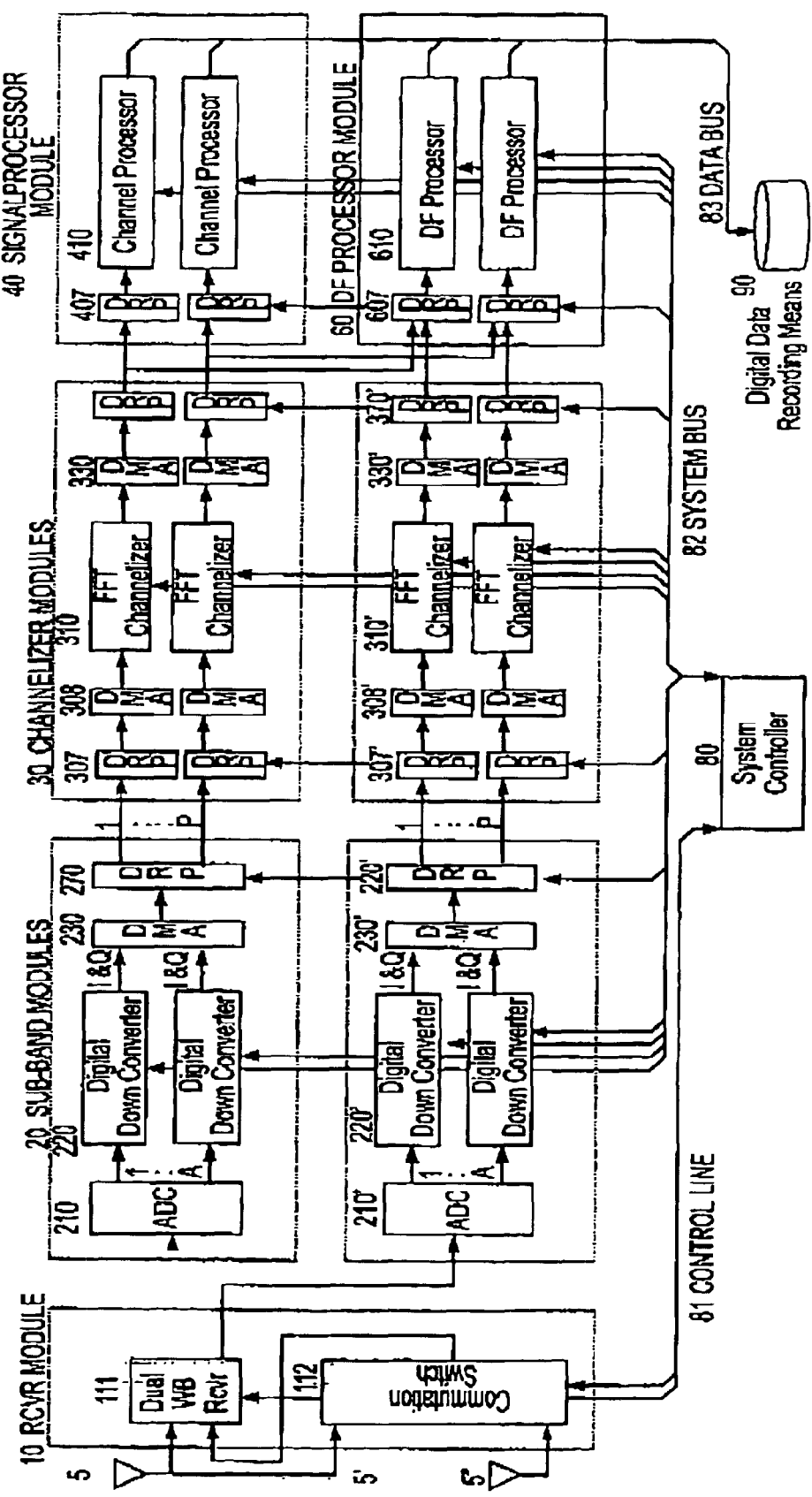
FIG. 7 diagrammatically illustrates alternative embodiment of present invention to receive, demodulate, recognize, and DF signals from 2-Channel arrangement. Three sensors 5, 5', 5" representing reference, spatial sine-phase, and spatial cosine phase antennas or acoustic sensors are divided into to processing chains. First channel sensor 5 comprises first channel receiver of dual channel receiver 111 of module 10 and processing chain of respective first channel sub-band decimation module 20, channelizer module 30, and signal processor module 40. Sensor output 5, 5', 5" are cyclically sampled by commutation switch and output to second receiver 111 of receiver module 10 connected sub-band decimation module 20', and channelizer module 30'. Collective first channel and commutated second channel channelized data is collectively received by DF processing module 60 comprising DF processors 610 for respective sub-band decimated channels and output data parameters to data bus 83 to recording means 90.

As shown in FIG. 7, reference antenna 5, sine-phase antenna 5', and cosine-phase antenna 5" provide RF or acoustic data sources to a dual wideband receiver 111. A first channel reference source 5 is received by a first wideband receiver of dual receivers 111 and a first ADC 210. A second channel cyclically commutates between reference 5, sine-phase 5' and cosine-phase 5" sources as input to a second wideband receiver of dual receivers 111 and a second ADC 210'. The first and second wideband receivers 111 are coherently phase locked, and the first and second ADCs 210, 210' are time synchronized.

First and second channel digital data output from the first and second respective ADCs 210, 210' are received by respective plurality of wideband decimation devices 220, 220' and respective FFT hyperchannelization processors 310, 310'. The first channel of hyperchannel data is received by respective plurality first channel of channel processors 410 comprising respective plurality of first channel spectral detection processor 414. Respective first channel spectral detection processors 414 spawn the operation of first channel demodulation synthesis filter processor 415 comprising two-stage synthesis filtering device 416, a plurality of synthesis filter receivers 417, and synthesis filter control and demodulation processor 435 to detect, demodulate and identify a signal of interest. Concurrently, respective first channel and second commutated channels of hyperchannel data are received by respective plurality of 2-channel comparative DF processors 610.

Figure 8C:
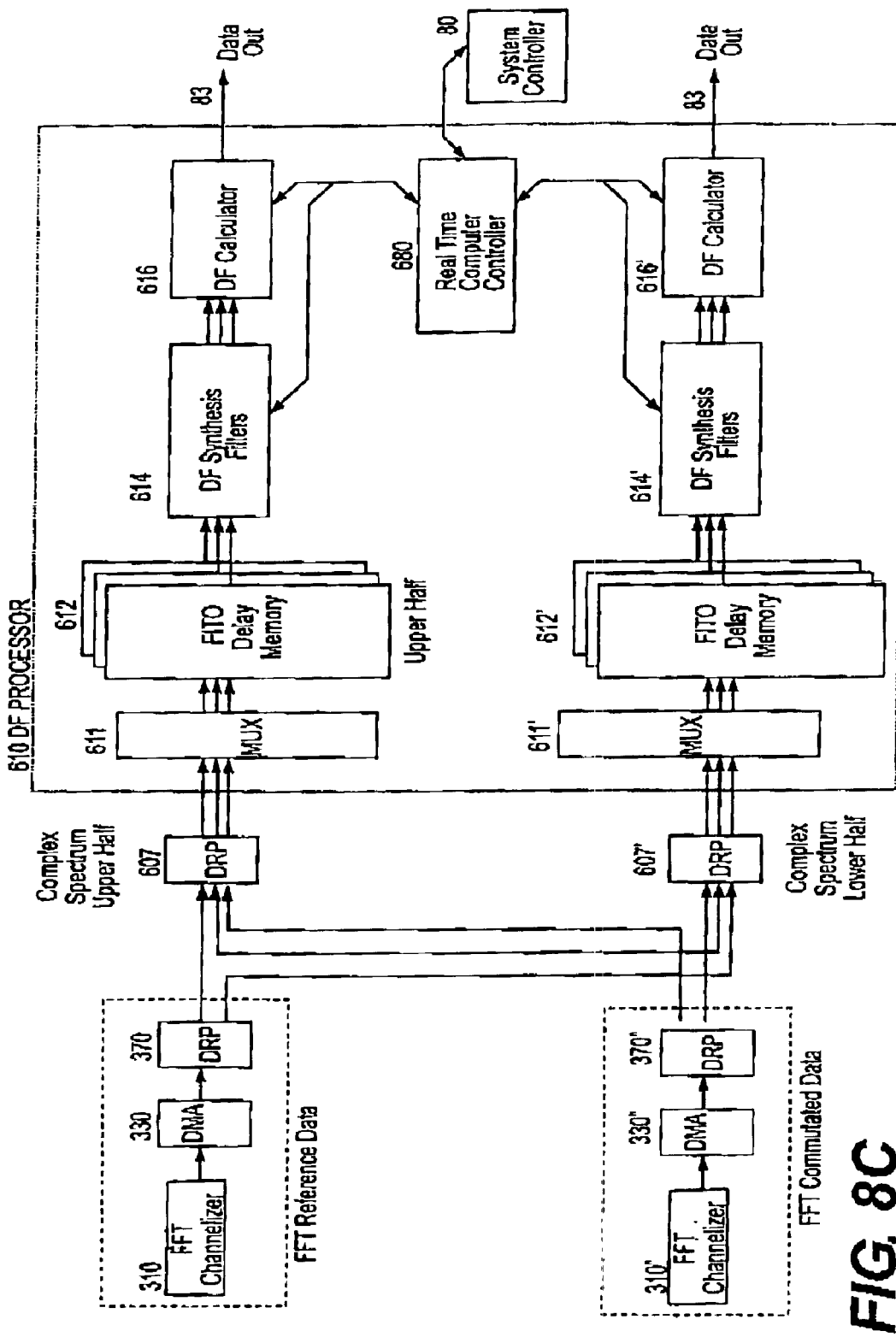
FIG. 8*c* illustrates a variation of the DF processor of present invention for receiving 2-Channel hyperchannel spectral input. DF processor comprises multiplex 611, 611' for receiving upper and lower spectral half data, performing decommutation and calibration of second channel commutated data input, forming 3-Channel plieso-synchronous reference, spatial sine-phase, and spatial cosine-phase hyperchannels for output to respective three upper and three lower spectral half FITO delay memory buffers 612, 612' for collective output to respective upper and lower half DF synthesis filters 614, 614', that filter and transform three-channel hyperchannel spectral data to time domain data for collective output to respective DF calculators 616, 616' and angle of arrival output to system data bus 83.

Referring to FIGS. 7 and 8c, respective data port router 607 and 607' of DF processor module 60 receives respective upper and lower spectral half of sub-band of first and second FFT hyperchannel data and outputs to respective DF processor 610. DF processor 610 comprises multiplexers 611 and 611' that receive respective upper and lower half data and output data to respective three channel upper and lower half FITO delay memory buffers 612, 612' that output hyperchannelized data from reference channel, sine-phase channel, and cosine-phase channel to respective upper and lower half DF synthesis filters 614, 614' connected to respective DF calculators 616, 616' for AOA output to data bus 83. As one of skill in the art would understand, amplitude and phase angle correlation, Watson-Watt amplitude, or other angle of arrival algorithms may be implemented by DF calculator to calculate the angle of arrival.

2-Channel DF Multiplexer

Figure 10C:
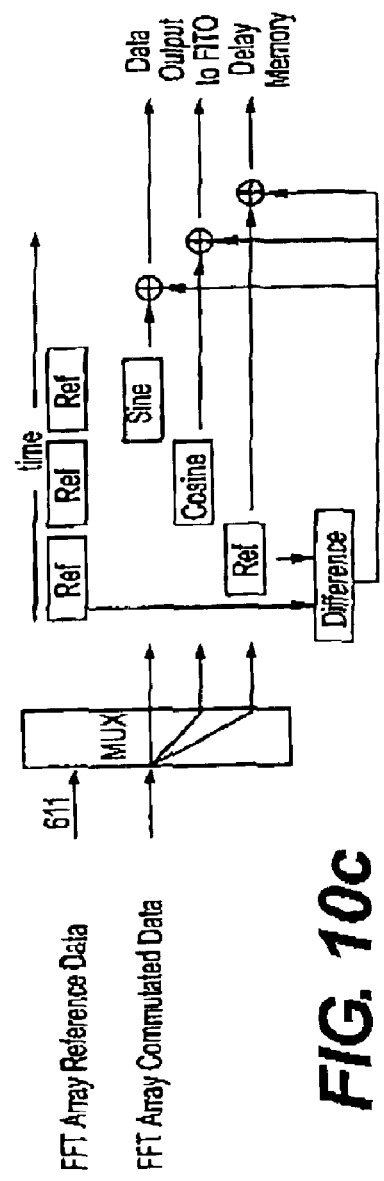
FIG. 10c illustrates data flow through 2-channel multiplexer 611 of DF processor 610. Respective hyperchannel data from first channel reference hyperchannel data and second channel commutated reference, sine-phase, and cosine-phase hyperchannel data from respective FFT hyperchannelizer (upper or lower spectral half) is received by respective multiplexer 611 by means of high speed data router and ports (not shown). Multiplexer orders respective hyperchannel data of first channel reference data and second channel commutated data. Multiplexer compares time related reference data from first and second channel for calibration. Difference between respective reference value between first and second channel is added to respective second channel reference, sine-phase and cosine-phase data of second channel. Parallel output of second channel reference, sine-phase and cosine-phase data is at one third the input data rate.

Referring to FIG. 10c, it can be seen that multiplexer device for receiving 2-channel reference and commutated hyperchannel data operates differently from multiplexers employed by N-channel or 3-channel comparative DF operation. Where as N-channel and 3-channel data is collectively received by multiplexer 611 and directly output to N plurality or 3 plurality FITO delay memory buffers as illustrated in FIGS. 10a and 10b, 2-Channel DF multiplexer 611 operation as illustrated in FIG. 10c decommutates second channel FFT hyperchannel commutated data. In the embodiment of the present invention incorporating 2-Channel DF multiplexer 611 performs two operations on second channel FFT hyperchannel commutated data: (1) time commutated second channel data is separated into three channels representing reference source, sine-phase source, and cosine-phase source hyperchannel data; (2) FFT hyperchannel commutated data calibration is performed.

2-Channel DF multiplexer performs calibration by operation of comparing respective first channel reference data sample and second channel reference data samples representing synchronous FFT hyperchannel data. Since identical synchronous reference source 5 is origin of both first and second channel hyperchannel are compared by multiplexer operation, difference between first and second channel reference data is attributed to difference in analog filters (not shown) and dual wideband receivers 111. Therefore same difference is applied to following second channel sine-phase and cosine-phase FFT hyperchannel samples. A calibration operation in 2-Channel DF multiplexer 611 performs adjustment on respective commutated channel data in such a manner that all hyperchannels of the second channel are adjusted an amount to ensure the reference data of the second channel equals the reference data of the first channel. 2-Channel multiplexer 611 therefore applies first to second channel reference difference to following second channel reference, sine-phase channel, and cosine-phase channel FFT hyperchannel data.

2-Channel DF multiplexers 611, 611' outputs corrected reference channel, sine-phase channel, and cosine-phase FFT hyperchannel data to respective three FITO delay memory buffers 612, 612'.

2-Channel DF Synthesis Filters

The DF synthesis filtering device 614, 614' performs three synthesis filters on the plesio-synchronous second channel reference, sine-phase and cosine-phase respective subset of hyperchannels output from respective 2-Channel FITO buffers 612, 612' received from 2-Channel DF multiplexers 611, 611'. In this 2-channel commutated DF embodiment, two-stage synthesis filtering is used in a manner similar to the first channel synthesis and provide three filtered time domain outputs of detected signal activity.

In yet another implementation of the direction finding embodiment, additional cyclic synthesis filters can be added to perform fine grain spectral filtering on the second channel data based on the first channel synthesis filtering of the signal demodulation and recognition processor 415. Specifically, multichannel data is filtered in like manner of first stage of two-stage DF synthesis filter 614 comprising plurality of channel multipliers connected to common shape filter and common step tune selector multiplier indices offset. Multichannel multiplier product is output to respective multichannel inverse FFT connected to respective multichannel phase rotators connected to respective multichannel FIFO DMA buffers for output. In this preferred embodiment, output from plurality of fine-grain synthesis filters for each source channel are received by plurality of DF calculators. AOA for each respective fine-grain syntheses filter is computed according to comparative DF algorithm or other algorithms known to those skilled in the art. DF calculator outputs plurality of AOAs from respective plurality of fine grain synthesis filters to data bus 83. Subsequent data analysis processes may use plurality of AOAs from signal activity as individual representations of direction or may be averaged to provide statistical representation of direction of arrival as performed by well understood mathematical averaging operations.

Other Direction Finding Embodiments

In the above-described implementations of direction finding embodiment of the invention, a received subset of delayed FFT hyperchannel data from each antenna or data source is selected by a first channel spectral detection processor and used to spawn 2-channel commutated DF, 3-channel comparative DF or N-Channel DF synthesis filter and DF calculation processor for angle of arrival calculation.

However, in other potential DF embodiments of the present invention, the selected subset of FFT hyperchannel data may be known a priori for fixed channel signal activity and may be immediately selected for DF synthesis filtering and DF calculation, and need not be dependent upon first channel spectral detection or signal recognition process direction. Alternatively, the complete set of FFT hyperchannel data may be accepted from N multichannel sources. Here, synthesis filtering is not required, and a N-multichannel comparative or 2-Channel commutated DF algorithm is performed on each hyperchannel.

It is to be understood that, in the DF embodiments of the present invention, performing angle of arrival determination on every hyperchannel, a direction finding module may precede and replace a signal recognition and demodulation module comprising signal detection processor. An alternative signal activity detection processor would be used to compare multiple adjacent hyperchannels for amplitude and angle of arrival consistency. Amplitude and angle of arrival consistency criteria for various signals of interest are simultaneously applied by respective DF consistency signal activity detection processor. As with the spectral detection processor, a DF consistency signal activity detection processor spawns the operation of module processes of synthesis filtering and signal recognition. In this embodiment of the invention, data 83 is replaced by high-speed data routers to output signal activity hyperchannel center (frequency), number of adjacent hyperchannels (bandwidth), and time of hyperchannel signal activity to respectively spawned digital signal processing modules.

Figure 11A:
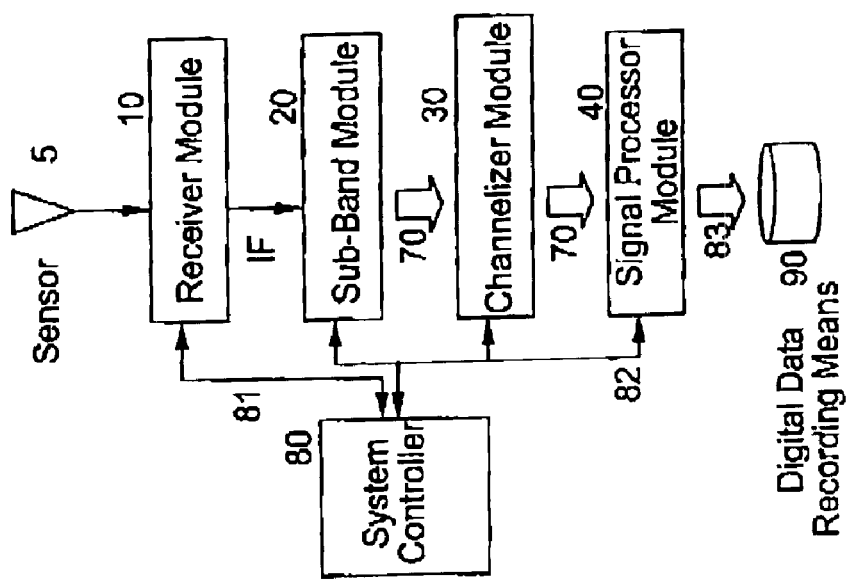
FIG. 11a illustrates one variation of the ordering of processing modules of the present invention for a single sensor system to perform signal activity detection and recognition, Sensor 5 connects to receiver module 10 providing analog wideband IF output to sub-band module 20 that performs analog to digital conversion and sub-band decimation connected to channelizer module 30 by high speed router 70. Channelizer module 30 performs respective sub-band FFT and outputs respective hyperchannelized spectral data to signal processor module 40 connected by high speed router 70. Signal processor module 40 performs signal activity detection and spawns signal demodulation and recognition processors using synthesis filtering and parallel demodulators to determine signal of interest. Signal of interest parameters are output by means of data bus 83 to digital recorder means 90. System controller 80 controls receivers by means of control line 81 and digital modules by means of system bus 82.
Figure 11B:
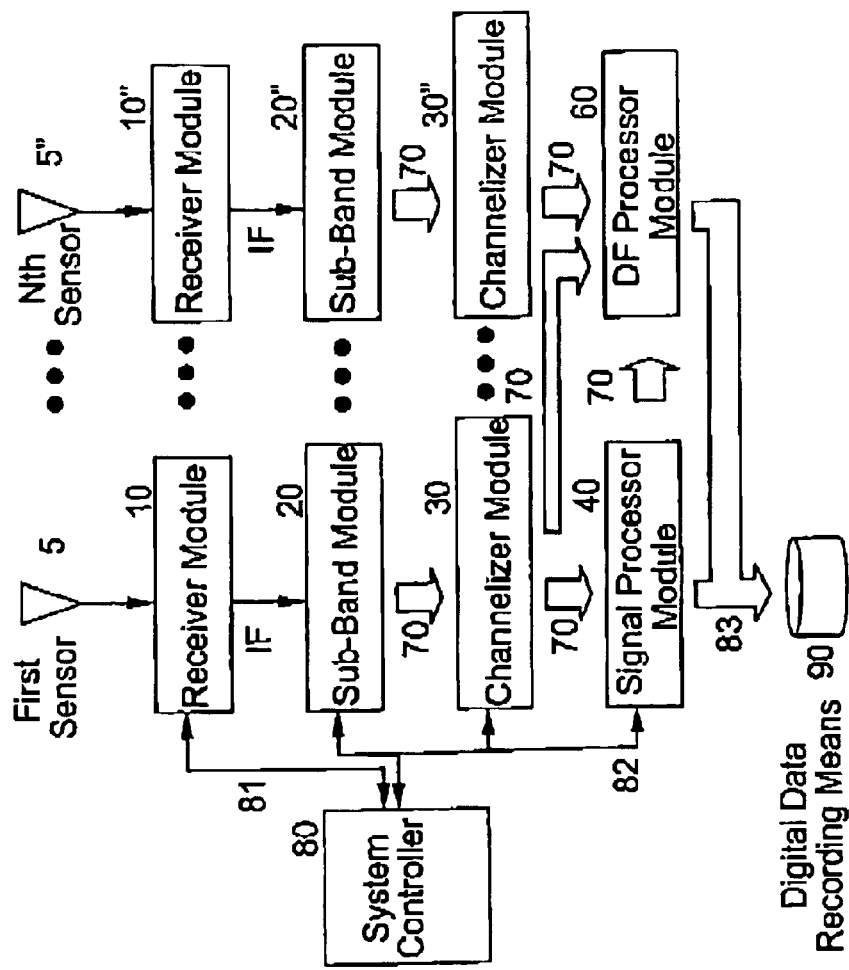
FIG. 11b illustrates another variation of the ordering of processing modules of the present invention for an N-sensor system to perform signal activity detection, recognition, and direction finding. Sensors 5 to 5" connect to respective receiver modules 10 to 10" providing analog wideband IF output to respective sub-band modules 20 to 20" that perform analog to digital conversion and sub-band decimation connected to channelizer modules 30 to 30" by high speed router 70. Channelizer modules 30 to 30" perform respective sub-band FFT and outputs respective hyperchannelized spectral data to respective signal processor modules 40 to 40" connected by high speed router 70. First channel signal processor modules 40 performs signal activity detection and spawns signal demodulation and recognition processors using synthesis filtering and parallel demodulators to determine signal of interest. Signal of interest parameters are output to DF processor 60 that receives collective N-sensor hyperchannel data from FFT channelizer modules 30 to 30" and outputs angle of arrival parameters for respective signal of interest to data bus 83 connected to digital recording means 90. System controller 80 controls receivers by means of control line 81 and digital modules by means of system bus 82.
Figure 11C:
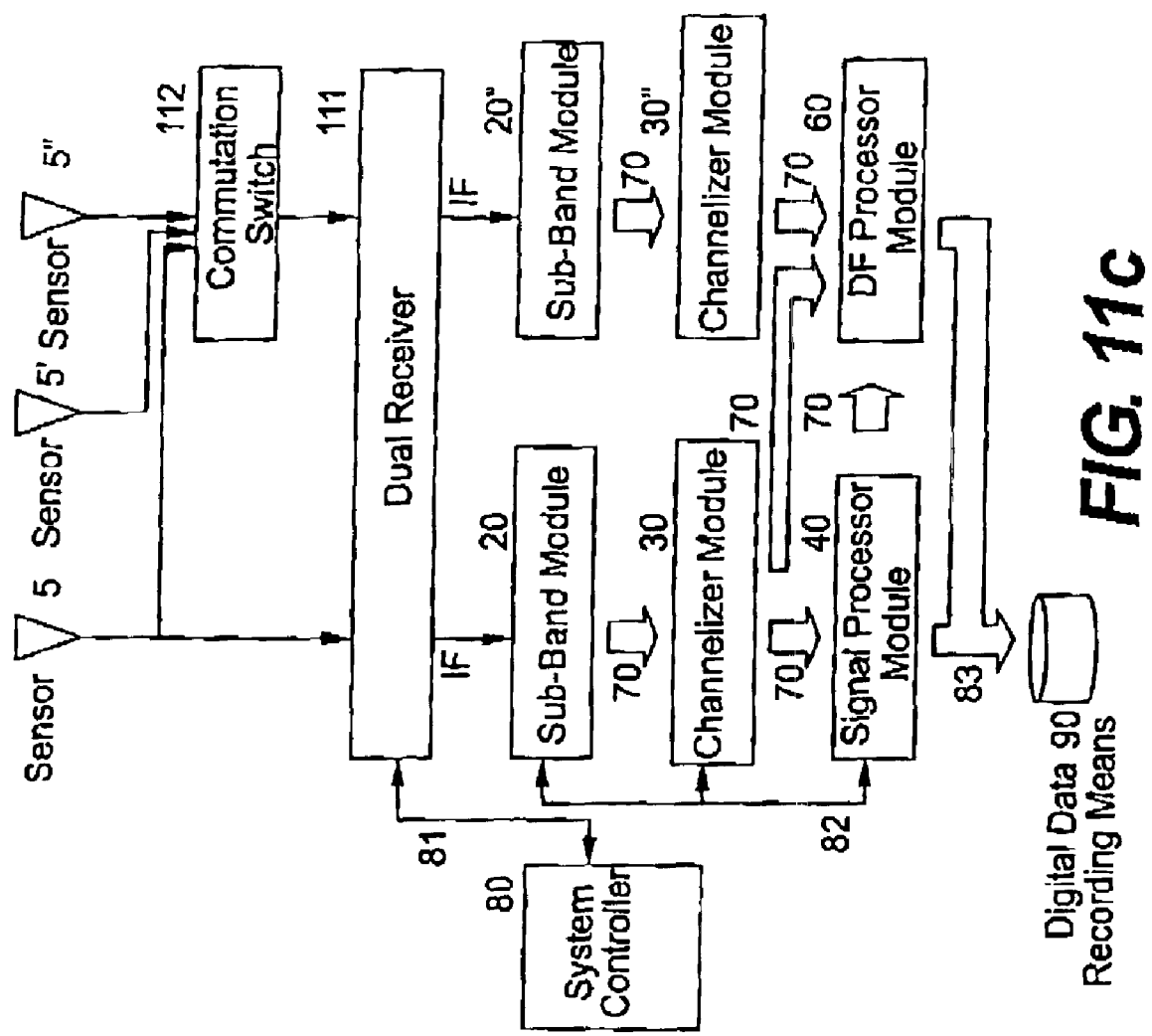
FIG. 11c illustrates another variation of the ordering of processing modules of the present invention for a 3-sensor system commutated system to perform signal activity detection, recognition, and commutated direction finding. Reference sensor 5 connects to respective first receiver of dual receiver 111 providing analog wideband IF output to respective first sub-band module 20. Reference sensor 5, sine-phase sensor 5' and cosine-phase sensor 5" connect to commutative switch 112 that cyclically outputs reference, sine-phase, and cosine-phase RF or acoustic signal to second receiver of dual receiver 111 providing analog wideband IF output to respective second sub-band module 20" that perform analog to digital conversion and sub-band decimation. Respective first and second sub-band modules 20 and 20" are connected to respective channelizer modules 30 and 30" by high speed router 70. Respective channelizer module 30 and 30" perform respective sub-band FFT and outputs respective hyperchannelized spectral data to respective signal processor modules 40 and 40" connected by high speed router 70. First channel signal processor modules 40 performs signal activity detection and spawns signal demodulation and recognition processors using synthesis filtering and parallel demodulators to determine signal of interest. Signal of interest parameters are output to DF processor 60 that receives first channel reference and second channel cyclic reference, sine-phase, and cosine-phase hyperchannel data from respective FFT channelizer modules 30 and 30". DF processor 60 comprising multiplexer 611 (not shown) performs calibration of second channel reference, sine-phase, and cosine phase data and outputs hyperchannel data in parallel through synthesis filters (not shown) and collective DF calculator (not shown) and outputs angle of arrival parameters for respective signal of interest to data bus 83 connected to digital recording means 90. System controller 80 controls receivers by means of control line 81 and digital modules by means of system bus 82.
Figure 11D:
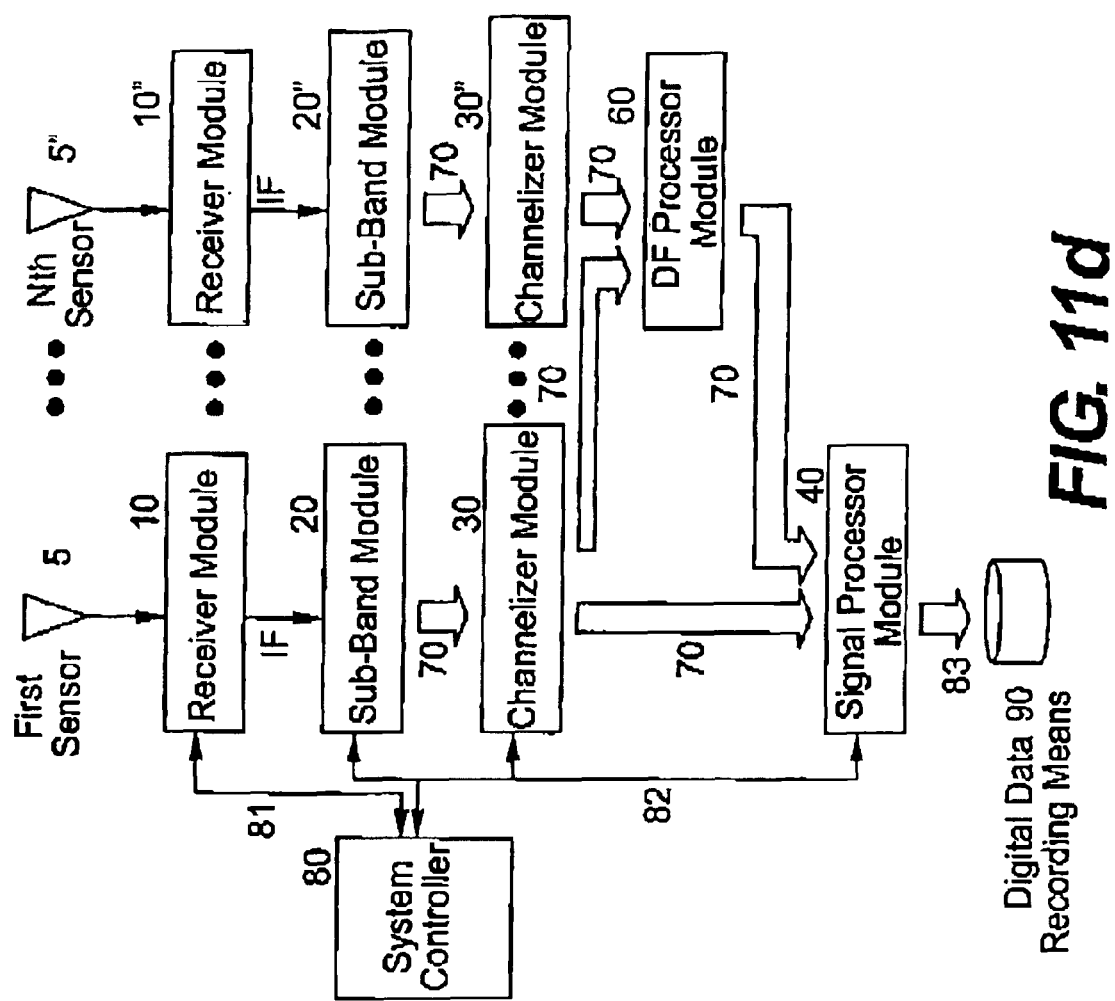
FIG. 11d illustrates another variation of the ordering of processing modules of the present invention for an N-sensor system to perform direction finding, constant angle of arrival activity, and signal of interest recognition. Sensors 5 to 5" connect to respective receiver modules 10 to 10" providing analog wideband IF output to respective sub-band modules 20 to 20" that perform analog to digital conversion and sub-band decimation connected to channelizer modules 30 to 30" by high speed router 70. Channelizer modules 30 to 30" perform respective sub-band FFT and outputs respective hyperchannelized spectral data to respective collective DF processor module 60 and to first channel signal processor module 40 connected by high speed router 70. DF processor module performs N-sensor direction of arrival calculation on each hyperchannel with angle of arrival parameters output to first channel signal processor module 40 by means of high speed data router 70. Detection processor 414 (not shown) of first channel signal processor module performs direction of arrival sorting, and spawns signal demodulation and recognition processors 415 (not shown) using synthesis filtering to tune to each constant angle hyperchannel and using parallel demodulators to determine signal of interest. Signal of interest parameters are output to data bus 83 connected to digital recording means 90. System controller 80 controls receivers by means of control line 81 and digital modules by means of system bus 82.

For summary of the above embodiments, FIG. 11*a* depicts arrangement of receiver and processing modules for single sensor source sub-band decimation, signal hyperchannelization, signal recognition and demodulation; FIG. 11*b* depicts arrangement of N sensors 5 . . . 5", connected to corresponding N receiver modules, first channel processing modules of sub-band decimation, signal hyperchannelization, signal recognition and demodulation, N-channels of sub-band decimation, signal hyperchannelization and collective N-channel module for direction finding (including N-sensor and 3-sensor comparative data for DF calculation); FIG. 11*c* depicts invention embodiment of 3 sensor sources with commutated second channel, arrangement of first channel receivers and respective first channel processing modules of sub-band decimation, signal hyperchannelization, signal recognition and demodulation, and second channel receiver and second channel processing modules of sub-band decimation, signal hyperchannelization, and collective second channel module for direction finding (using calibrated 3-sensor commutated data for DF calculation); FIG. 11*d* depicts N-channel invention embodiment wherein DF processor precedes signal detection and recognition. DF information from collective N-channel DF processor is output by high speed data router to first channel signal processor, performing signal activity detection and spawning of signal recognition and demodulation processors based upon consistent angle of arrival direction over desired signal bandwidth.

Beamforming

Figure 8D:
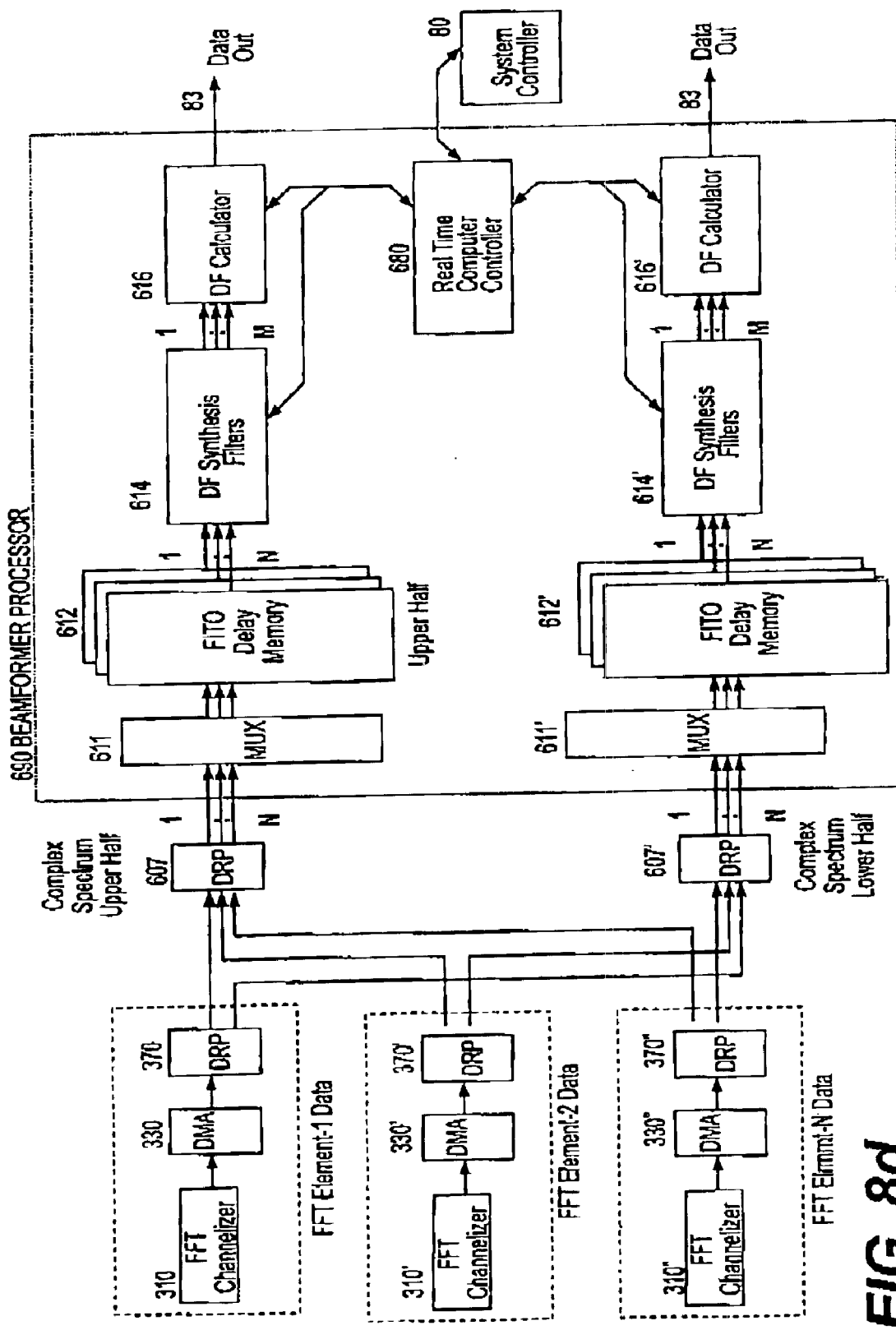
FIG. 8*d* illustrates a variation of the present invention for beam forming N-sensor hyperchannel spectral input. Beamforming processor 690 comprises multiplexer 611, 611' for receiving upper and lower spectral half data connected to respective First In Tap Out (FITO) delay memory buffers for collective output to respective N-sensor beamformers 617, 617' that filter apply beamforming weights to each N-sensor hyperchannel input, providing one or more plurality weighted beamformed outputs to respective high speed data port 670, 670'.
Figure 9B:
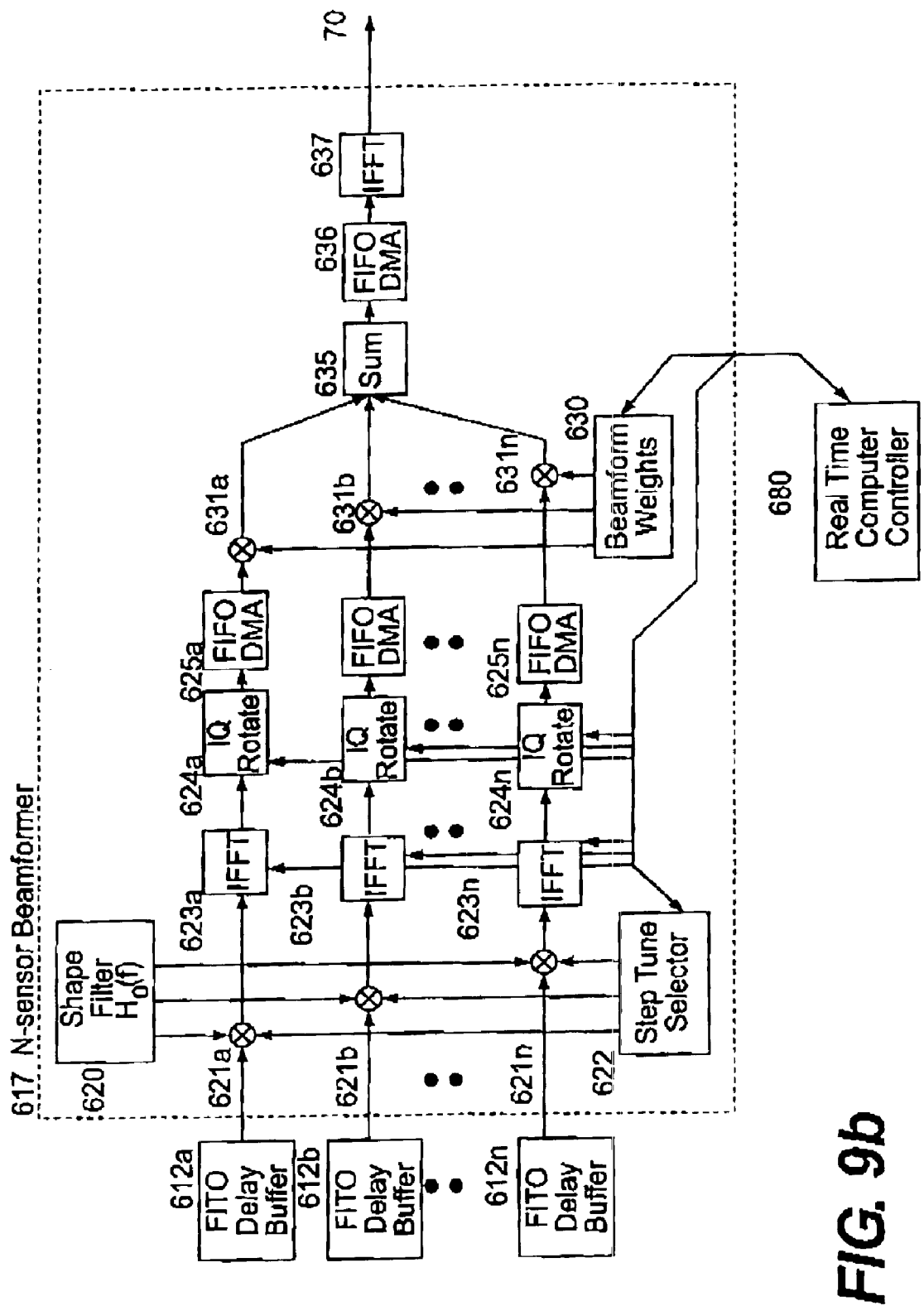
FIG. 9*b* illustrates an N-sensor beamformer 617 comprising first stage multipliers 621*a* to 621*n* receiving hyperchannel data from respective FITO buffers 612*a* to 612*n* and multiplying input by common filter weight 620 with common shifted indices set by step tune selector 622 output to respective first stage inverse FFT devices 623*a* to 623*n*. Inverse FFT devices are 623*a* to 623*n* are connected to respective contra-phase I&Q rotation devices 624*a* to 624*n* with output to respective first stage FIFO buffers 625*a* to 625*n*. Tuned and filtered hyperchannel time-domain output of FIFO buffers 625*a* to 625*n* is received by respective multiplier devices 631*a* to 631*n* that multiply respective N-sensor time domain data by N-sensor complex weights 630 connected to summer device 635 that collectively adds weighted N-sensor data into a single beamformed time domain output to FIFO buffer 636. Time domain beamformed output 636 is transformed to frequency domain by FFT 637 for output to high speed data router 70. It is to be understood that time domain data may be selected for output in additional variations of N-sensor beamformer 617.
Figure 11E:
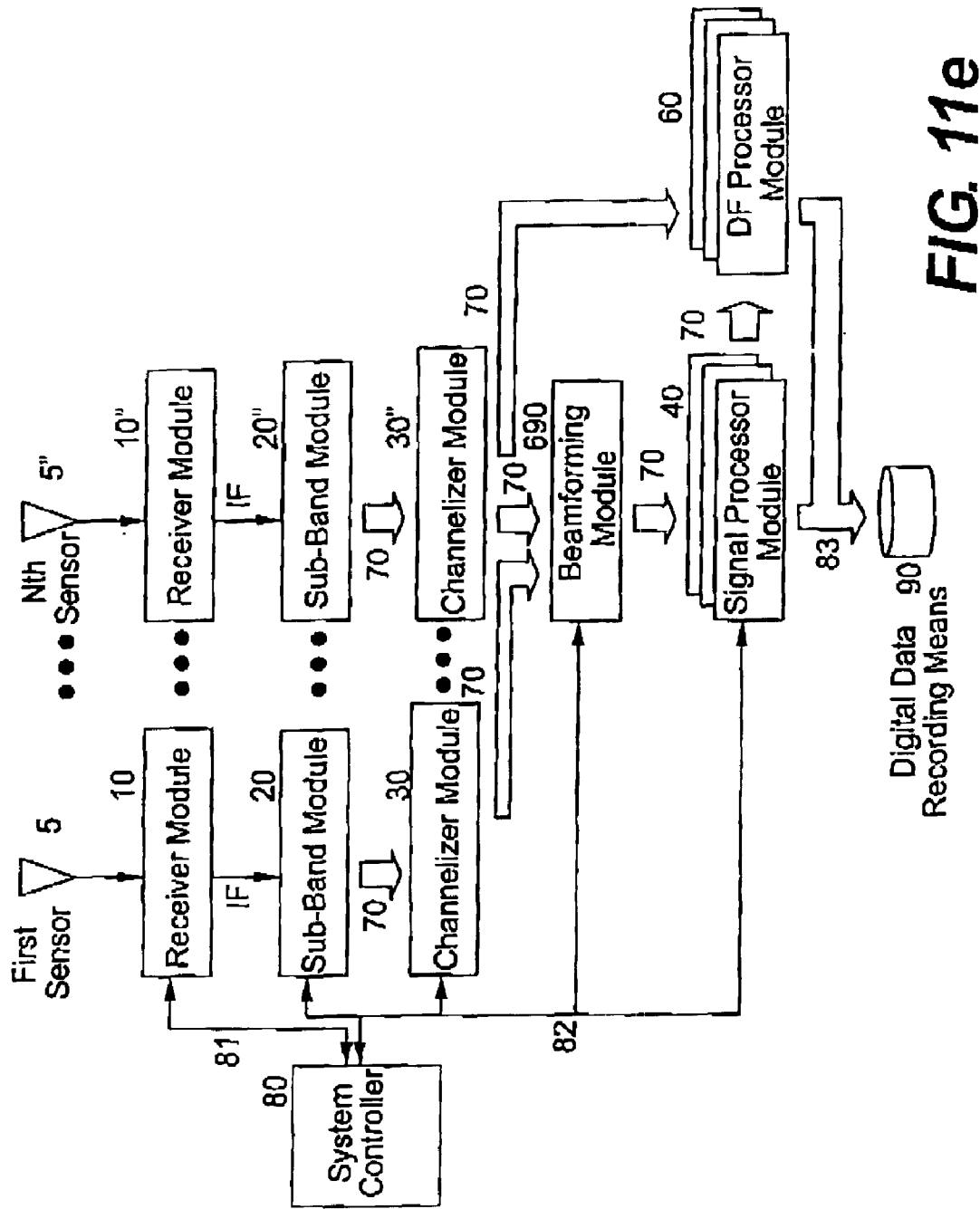
FIG. 11e illustrates another variation of the present invention for an N-sensor system to perform beamforming signal to noise enhancement, signal activity detection, recognition, and direction finding. Sensors 5 to 5" connect to respective receiver modules 10 to 10" providing analog wideband IF output to respective sub-band modules 20 to 20" that perform analog to digital conversion and sub-band decimation connected to channelizer modules 30 to 30" by high speed router 70. Channelizer modules 30 to 30" perform respective sub-band FFT and outputs respective hyperchannelized spectral data to collective beamformer module 690 and to collective DF processor module 60 by means of high speed data router 70. Beamformer 690 performs one or more plurality N-sensor weighting and N-sensor hyperchannel combining, outputting one or more plurality of spatially directive beams of hyperchannel data to respective plurality of signal processor modules 40 by high speed router 70. Signal of interest parameters are output to respective beam DF processor 60 that receives collective N-sensor beam hyperchannel data from channelizer module 30 and output angle of arrival parameters for respective signal of interest to data bus 83 connected to digital recording means 90. System controller 80 controls receivers by means of control line 81 and digital modules by means of system bus 82.

Yet another embodiment of the invention is to perform beamforming to enhance initial signal detection. Referring to FIG. 11*e*, processing modules are again rearranged. In this embodiment, beamformer module 690 provides a means for spatial enhancement of N-sensor data prior to signal detection modules 40. Beamforming sensor data may be performed on a wideband or narrowband plurality of hyperchannel data. As illustrated in FIGS. 8*d* and 9*b*, one or more plurality of beamforming processors 617 use beamform weighting 630. Beamformer 617 receives N-sensor hyperchannel data from respective FITO delay memory buffers 612*a* to 612*n* and performs filtering and tuning connected to respective inverse FFT 623*a* to 623*n* and phase rotation compensators 624*a* to 624*n* that output time-domain data to respective FIFO data buffer 625*a* to 625*n*. Respective N-sensor time-domain data from data buffers 625*a* to 625*n* are multiplied by N-sensor beamforming weights 630 by respective multiplier devices 631*a* to 631*n*, summed by device 635, and output to FIFO buffer 636. Buffered beamformed summed output 636 is received and transformed to hyperchannel frequency domain by FFT device 637 and output to high speed router device 70.

Beamforming may be performed on any plurality of hyperchannels including the plurality of all hyperchannels representing the full bandwidth of the wideband front-end receivers and channelizer modules 30. Beamforming weights may be provided a priori as illustrated in FIG. 9b. It is to be understood that amplitude and/or phase biases of the sensor and RF paths (i.e., sensor location, RF cables, RF distribution, filtering and digitization) are controlled, and characterized between all N sensor channels. A calibration table or other such normalization scheme characterizes constant biases. The calibration table is used to compensate for, and normalize each sensor RF path. The wideband data is digitized at a rate greater than Nyquist for the frequency of interest and routed to pre-processing functions. The digitization process must be done such that the phase of the digitization clocks remains constant between all sensor channels.

Beamforming may be performed in conjunction with signal processor module 40, wherein the hyperchannels selected for beamforming represent the bandwidth of a specific signal of interest. Beamforming may be performed prior to signal detection, from such common channel signals as cellular, wireless, and other personnel communication services (PCS) where signal activity is known a-priori in specified narrowband channels.

To achieve the beamformed processing the N sensor hyperchannels are combined into a single path by means of a sum-of-weighted-taps known to one of ordinary skill in the art may be implemented either in the time domain as a sum-of-weighted-taps or in the equivalent FFT/hyper-channelization transfer function frequency domain processing.

The N-sensor beamforming may be performed at various stages of processing (i.e. before decimation, before or within the hyper-channelization process, or before, within or after the matched bandwidth processing).

The flexibility in order of processing stages provides for a means to balance and optimized process loading. The values of the sum-of-weighted-taps weights and taps provide the spatial filtering pattern. The values of the sum-of-weighted-taps weights and taps are applied across the band to which that spatial filtering is to be applied. The particular spatial filter may be applied to the complete spectra or one or many sub-bands. The band of application is known at the time of application. The band may be known by a priori information or as the result of another processing stage (i.e. Detection, Narrowband processing, etc.) The particular spatial filter being applied is also known at the time of application. The spatial filter may be known by sector of interest, or could be derived from another processing stage (i.e., DF or a previous Beamformed processing stage). The spatial filter and band of application may be altered or modified during processing or (because of data buffering) re-applied from a previous time. The path combination process function (at whatever stage included) provides the data to a router function for distribution to a follow-on processor stage. Each processing stage applied before path combination (whenever applied and including path combination) must take care to not introduce any biases between each of the N-sensor paths. This is done by taking care to performing identical processing to each respective sensor path and assuring the identical processing functions are applied equivalently to the data samples for each path digitized at the same time. This requires that any transfer function applied (i.e. FIR filter, IIR filter, FFT, IFFT, decimating filter, hyper-channelization, cyclostationary process or the like) be started and operate on data samples generated from the same digitization clock cycle from each sensor path. For a typical embodiment, a preprocessing hyper-channelization function converts the time samples to a series of frequency spectra for each sensor path at a rate greater the Nyquist for the individual FFT bin resolution. The rate in which the FFT is greater than the Nyquist rate for that frequency bin is the overlap percentage. Typical overlap percentages for Beamedformed collection processing are between 6.25 to 87.5%. The size of the FFT bins is such that each is of finer resolution than an individual signal waveform. Typical FFT hyperchannel resolutions are 1 to 25% of signal waveforms.

Adaptive Beamforming

If the frequency and characteristics are not completely known a priori, a processing function may be applied to detect signal presents and estimate new or improved beamforming weight parameters including weights for either signal enhancement (beamforming) or weights for interference rejection (adaptive nulling). This process may also monitor control channels to determine similar information. A router function may then route the data in its entirety or as a subset to subsequent processing modules as illustrated in FIG. 11e, showing beamform hyperchannel data provided to signal processing module 40.

Time Difference of Arrival (TDOA) and Frequency Difference of Arrival (FDOA)

Time Difference of Arrival (TDOA) and Frequency Difference of Arrival (FDOA) signal processing provides a means for band limited hyperbolic direction of arrival and location processing that is match to the frequency of the signal energy or waveform. To perform TDOA processing, received signal or waveforms must be time-tagged in a consistent reference frame, allowing two or more plurality of systems to time compare signal data. In the embodiment of the present invention, analog to digital conversion in ADC 210 of sub-band module 20 applies time-tags to digitized signal or waveform time domain data packets using an accurate time reference (not shown in FIG. 1a or 1b) such as a Global Positioning System (GPS) clock, cesium-beam clock, or other such accurate time keeping means.

The time, group, amplitude and phase bias and/or delays of the RF paths (i.e. antenna location, RF cables, RF distribution, filtering and digitization), time synchronization (i.e. GPS receiver, time code generator, 1 pulse-per-second circuitry, digitization clock, and time reference) and sample time association (i.e. time resolution, time representation, and time communication) are controlled and characterized for all channels. Ambiguity in the characteristics of the paths that are not known a priori may be calibrated. A calibration table characterizes all constant biases and said table is used to compensate for, and normalize each path.

The wideband data is digitized by ADC 210 at a rate greater than Nyquist for the receiver bandwidth of interest and routed to a pre-processing function. For TDOA, two or more plurality of separate sensor systems as illustrated in FIG. 1a comprising receiver module 10 connected to sub-band module 20 connected to channelizer module 30 connected to signal processing module 40 are required to measure sensor data time of arrival from spatially diverse sensors.

Figure 1B:
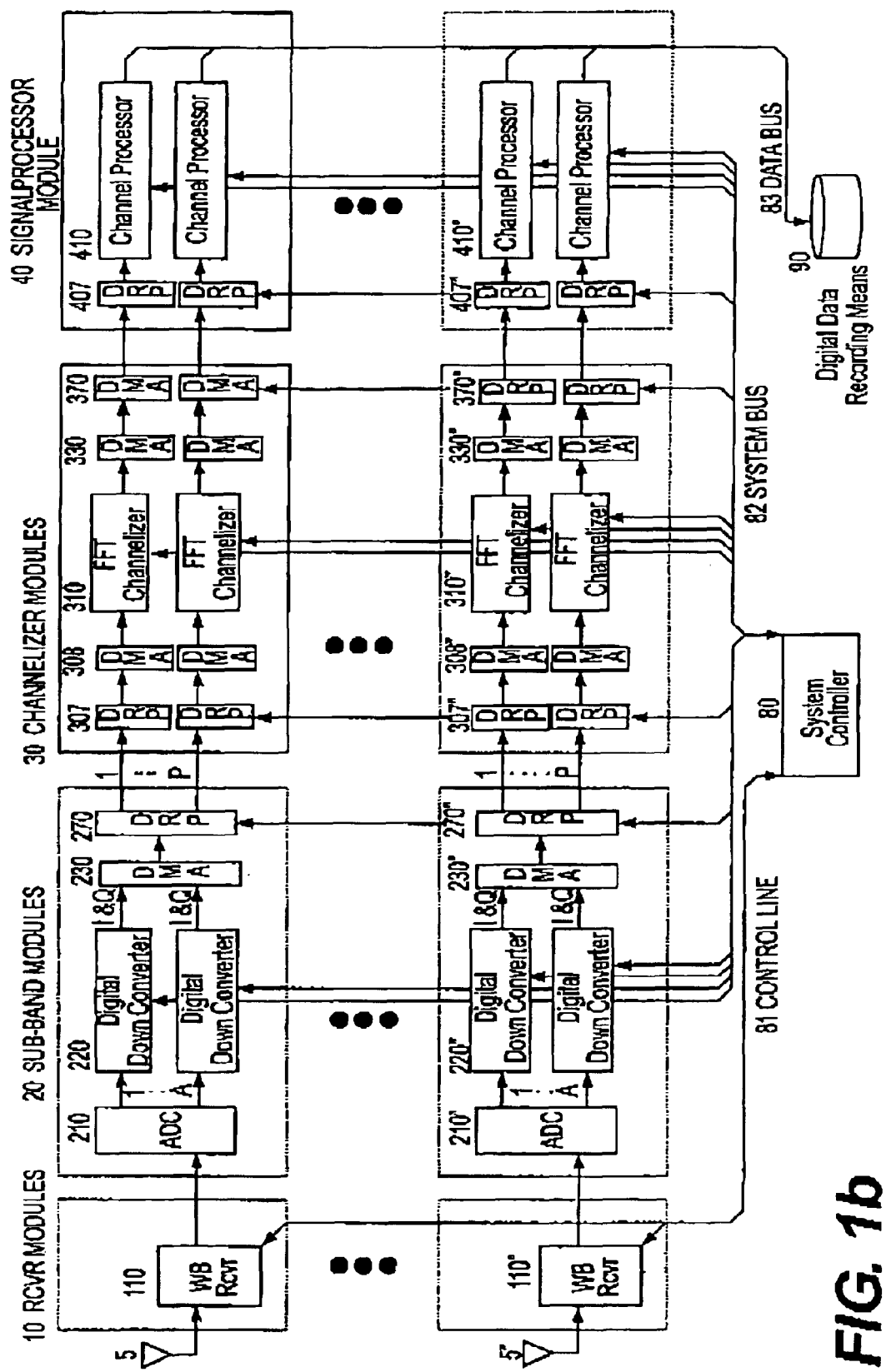
FIG. 1b diagrammatically illustrates an N-sensor embodiment of the invention, channelizing N wideband sensor inputs into a respective plurality of sub-bands and channels for signal processing. Such a variation of the invention is useful for parallel comparison of time of arrival of signals for Time Difference of Arrival geolocation means.

In another variation of the TDOA embodiment of the present invention, spatially diverse N-sensor data may be brought together in one N-channel system as illustrated in FIG. 1b, receiving N-sensor wideband data by N-plurality of receiver modules 10 to 10" connected to respective sub-band modules 20 to 20" connected to respective channelizer modules 30 to 30" connected to respective signal processor modules 40 to 40". First N-sensor channel signal processor module 40 performs signal detection and spawns identical signal demodulation and recognition processes in respective N-sensor signal processor modules 40 to 40". Common means of time of arrival measurement (e.g. time of first baud, linear regression of a set of bauds to estimate time of first baud, cross correlation of signal with a priori sequence, cross correlation of signal with first N-sensor channel signal data) from N-sensor channel signal processor modules 40 to 40" are compared by first N-sensor channel signal processor module 40, calculating Time Difference of Arrival (TDOA) for signal activity. To achieve the TDOA processing, the channels are correlated and compared with data collected from the responses of the spatially diverse antennas to determine geolocation.

The digitization process in each N-sensor channel must be done such that the phase of the digitization clocks remains constant between all channels. Time is associated with each digitization sample. This sample time associated remains linked to the data sample through data decimation, FFT hyperchannelization, FITO and FIFO buffering, filtering, tuning, and inverse FFT processing.

Therefore, time of arrival measurement or correlation processing can be performed at various stages of processing (i.e. before decimation, before or after the hyper-channelization process, or before or after the matched bandwidth processing). The flexibility in order of processing stages provides for a means to balance and optimized process loading. The time of arrival or correlation process may be applied to the complete spectra or one or many sub-bands (possibly overlapping) or to synthesis filter bands. The band of application is known at the time of application. The band may be known by a priori information or as the result of another processing stage (i.e., detection, synthesis filtering). The integration time used for time of arrival measurement (e.g., linear regression) or correlation may be known in advance of processing or may be determined during processing (i.e., amount of convergence). The band of application and integration time of processing may be altered or modified during processing or (because of data buffering) and re-applied from a previous time. The TDOA process function (at whatever stage included) provides the data to a router function for distribution of time measurement data to a follow-on processor stage. The TDOA correlation may occur on bandlimited data samples or waveform features. Waveform feature correlation allows for efficiently passing less data between paths for those waveforms that have extractable features. Each processing stage applied before TDOA processing (whenever applied and including TDOA processing) must take care to not introduce any biases between each of the paths. This is done by taking care to apply identical processing to each and assuring the identical processing is applied equivalently to the data samples for each path digitized at the same time. This requires that any transfer function applied (i.e. FIR filter, IIR filter, FFT, IFFT, decimating filter, hyper-channelization, cyclostationary process or the like) be started and operate on data samples generated from the same digitization clock cycle from each path and time association exists across each transfer function.

For a typical embodiment, a pre-processing hyper-channelization function converts the time samples to a series of frequency spectra for each path while maintaining the sample time association across the transfer. A router function may be applied to this data to parse the data by FFT bins (frequency) or this function may be applied to the entire set of FFT bins.

Additional stages of processing may be applied to optimized the band to be TDOA processed. A router function may be applied to this data. The router function (possible from spatially separate processes) brings the data streams from each of the path's data processing together for the TDOA time comparison or cross correlation process. The results of this process is a hyperbolic line of position and other parameters (i.e. quality, confidence, etc), or a time series of such based parameters. The resultant data may be combine in spatial or time-domain processing well known to those practiced in the art of TDOA geolocation to combine TDOA hyperbolic data into a geolocation and other parameters (i.e. quality, confidence, etc.) or a time series of such geolocation based parameters.

Frequency Difference of Arrival may be combined with the TDOA processing by techniques known to one skilled in the art to contribute to the geolocation process. FDOA contributions can either replace a necessary TDOA path or supplement the set. The data may be routed to functions that repeat select processing techniques already applied. This may typically include additional hyper-channelization stages and additional spatial filtering to apply an even more closely matched filter to provide optimized frequency waveform processing. As is well known, wide bandwidth allows optimal time of arrival estimates and narrow bandwidth allows optimal frequency estimates. The embodiment of the present invention can perform both optimizations by simultaneous processing paths with optimized hyperchannel bandwidths for both time correlation processes and synthesis filter frequency measurement processes.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom. In addition, the various embodiments and implementations of the present invention as disclosed and claimed above are suitable for use in many different industries and applications, including but not limited to the cellular, RADAR, medical diagnosis and data analysis, SONAR, acoustic, ultrasonic, video, broadcast, communications, telecommunications, geological oceanographic and natural science fields.

What is claimed is:

1. A system for detecting a signal, comprising:
   a receiver for receiving a wideband signal to be processed;
   a sub-band conversion module for converting the wideband signal into a plurality of sub-band signals to be processed;
   a channelizing module for Fast Fourier Transform channelizing said plurality of sub-band signals into a respective plurality of complex spectral components;
   a processing module for signal processing said plurality of complex spectral components, including a means for determining the presence of at least one signal of interest based on multiple time averaging analysis of said plurality of complex spectral components; and
   a high speed data router coupling each module to one another for digitally routing respective data between said modules;
   wherein said processing module includes a plurality of channel processors operatively connected to said data router so as to receive corresponding ones of said plurality of complex spectral components, each of said channel processors being formed so as to determine the presence of signal activity and perform demodulation of said at least one signal of interest within the corresponding complex spectral component thereof;

wherein said means for determining the presence of at least one signal of interest includes, within each of said plurality of channel processors:

a First-In-Tap-Out (FITO) delay memory operatively connected to receive and store said corresponding complex spectral component from said data router;

a detection processor for conducting spectral filtering by convolution of said corresponding complex spectral components stored in said FITO delay memory, and for generating spectral activity parameter data on said corresponding complex spectral components based on multiple spectral magnitude running averages on said corresponding complex spectral components;

at least one signal demodulation and recognition processor for filtering and demodulating said corresponding complex spectral components stored in said FITO delay memory based on the spectral activity parameter data generated by said detection processor and further refines and measures signal parameter data; and a real time controller for controlling the creation and operation of said at least one signal demodulation and recognition processor based on the spectral activity parameter data generated by said detection processor.

2. A system according to claim 1, wherein said means for determining the presence of at least one signal of interest further includes, within each of said plurality of channel processors:

a plurality of signal demodulation and recognition processors for filtering and demodulating said corresponding complex spectral components stored in said FITO delay memory based on the spectral activity parameter data generated by said detection processor.

3. A system according to claim 1, wherein said at least one signal demodulation and recognition processor for filtering, demodulating, and refining parameter data of said corresponding complex spectral components of at least one signal of interest further includes, within each of said plurality of demodulation and recognition processors:

a two-stage synthesis filter for receiving sub-set of complex spectral components of signal activity from delay-memory storing performing frequency domain filtering, hyperchannel frequency tuning and transforming hyperchannel spectral data into time-domain data;

at least one synthesis filter receiver for signal component filtering and hyperchannel frequency tuning; and a synthesis receiver controller and demodulation processor for performing a simultaneous plurality of demodulations, and comparing successful demodulation parameters to parameters of signals of interest provided by system control computer.

4. A method for detecting a signal comprising the steps of:

receiving a wideband signal for processing;

converting the wideband signal into a plurality of sub-band signals to be processed;

Fast Fourier Transform channelizing said plurality of sub-band signals into a respective plurality of complex spectral components; and determining the presence of at least one subset of adjacent spectral components based on multiple running averages and a time delayed average of said plurality of complex spectral components.

5. A method according to claim 4, wherein said step of converting the wideband signal includes analog-to-digital converting the received wideband signal, digitally down converting the digitally converted wideband signal so as to generate the plurality of sub-bands of the digitally converted wideband signal, and outputting said plurality of sub-band signals for channelizing.

6. A method according to claim 4, wherein said step of channelizing said plurality of sub-band signals includes Fast Fourier Transform (FFT) processing said plurality of sub-band signals via a corresponding plurality of FFT channels so as to generate a corresponding plurality of the complex spectral components, and outputting said plurality of complex spectral components for determining the presence of at least one subset of adjacent spectral components of signal activity.

7. A method according to claim 4, wherein said step of determining the presence of at least one subset of adjacent spectral components includes storing said complex spectral components, conducting spectral filter convolution of said complex spectral components, converting said complex spectral components to real spectral components, and generating spectral activity parameter data based on said real spectral components.

8. A method according to claim 7, wherein said step of filter convolution of said complex signal samples includes applying a convolution shaping filter incorporating only real weights.

9. A method according to claim 7, wherein said step of filter convolution of said complex signal samples includes applying a Blackman-Harris cosine filter.

10. A method according to claim 7, wherein said step of generating spectral parameter data includes generating spectral magnitude running averages and delayed running averages on said real spectral components.

11. A method according to claim 7, wherein said step of generating spectral activity parameter data based on said real spectral components includes generating parameter data on at least one of frequency, time of start, bandwidth, and signal modulation type of a signal of interest.

12. A method according to claim 10, wherein said step of Fast Fourier Transform (FFT) channelizing processes said plurality of sub-band signals via a corresponding plurality of FFT channels including hyperchannelizing said plurality of sub-band signals so as to generate complex spectral components with bandwidths narrower than a signal-of-interest bandwidth.

13. A method according to claim 12, wherein said step of hyperchannelizing said plurality of sub-band signals includes generating complex time-overlapped spectral data.

14. A method according to claim 10, wherein said step of generating spectral magnitude running averages on said real spectral components includes generating at least a short-term running average, a medium-term running average and a delayed long-term average.

15. A method according to claim 10, wherein said step of generating spectral magnitude running averages on said real spectral components further includes generating a long-term running average.

16. A method according to claim 10, wherein said step of generating running spectral averages on said real-spectral data includes generating short-term, medium-term and delayed long-term running spectral averages of said spectral magnitudes, and storing said running spectral averages in a buffer memory.

17. A method according to claim 10, wherein said step of generating running spectral averages on said real spectral signal includes generating short-term, medium-term, long-term and delayed long-term running spectral averages of said spectral magnitudes, and storing said running spectral averages in a spectral average buffer memory.

18. A method according to claim 12, wherein said step of hyperchannelizing said plurality of sub-band signals further includes a step of filtering said plurality of complex spectral components for data streams with bandwidths falling within a range or ranges of interest.

19. A method according to claim 12, wherein said step of hyperchannelizing said plurality of sub-band signals further includes a step of selecting data streams with one or more bandwidths of interest from said plurality of complex spectral components.

20. A method according to claim 12, wherein said step of hyperchannelizing said plurality of sub-band signals further includes a step of decimating said plurality of complex spectral components.

21. A method according to claim 12, wherein said step of hyperchannelizing said plurality of sub-band signals further includes a step of excising data streams with one or more bandwidths of interest from said plurality of complex spectral components.

22. A method according to claim 12, wherein said step of hyperchannelizing said plurality of sub-band signals further includes a step of time-sequentially windowing said plurality of complex spectral components.

23. A method according to claim 12, wherein said step of hyperchannelizing said plurality of sub-band signals further includes a step of separating said plurality of sub-band signals on the basis of cyclostationary filtering from said plurality of complex spectral components.

24. A method according to claim 4, further comprising a step of a priori or adaptively beamforming said complex spectral components to enhance the signal quality of a range or ranges of said complex spectral components.

25. A method for processing a complex spectral signal in order to demodulate and recognize a signal of interest, comprising the steps of:
    storing a time history of complex spectral signal to be processed in a buffer memory;
    selectively outputting a subset of said complex spectral signal stored in said buffer memory so as to represent a spectral band of signal;
    receiving said selected spectral band in a two-stage synthesis filter and tuner that center tunes on a candidate signal of interest in said spectral band, filters said spectral band, and outputs a time domain representation of said candidate signal to at least one of a plurality of synthesis filter receivers;
    transforming said time domain candidate signal into complex spectral data via said at least one of a plurality of synthesis filter receivers;
    performing fine tuning, signal component filtering, and time domain transformation of said transformed complex spectral data into transformed signal data;
    performing multiple simultaneous demodulations on said transformed signal data via a synthesis receiver controller and demodulation processor in accordance with predetermined signal of interest modulation types, wherein said step of performing multiple simultaneous demodulations includes measuring signal demodulation parameters of said transformed signal data;
    scoring said measured signal demodulation parameters by closeness of match to predetermined signal of interest parameters, said predetermined signal of interest parameters specifying threshold scores for measured signal demodulation parameters to be declared successful matches; and
    outputting successful signal of interest match scores.

26. A method according to claim 25, wherein said step of selectively outputting a subset of said complex spectral signal includes selecting said spectral band of signal activity subsets based on predetermined defined subsets.

27. A method according to claim 25, wherein said step of selectively outputting a subset of said complex spectral signal includes detecting the candidate signal of interest so as to determine a subset of the complex spectral signals with which said subset is associated, and selecting said spectral band of signal activity based on said detection.

28. A method according to claim 25, wherein said step of selectively outputting said complex spectral signal stored in said buffer memory includes forming said buffer memory in a First-In-Tap-Out (FITO) configuration whereby complex signal samples with selectively variable delay levels is generated.

29. A method according to claim 25, wherein said step of outputting signal of interest match scores includes outputting signal demodulation parameters.

30. A method according to claim 25, wherein said step of synthesis filtering said complex spectral signal includes applying a two-stage overlap and add filter.

31. A method according to claim 25, wherein said step of outputting signal of interest match scores includes outputting signal complex time domain data from said two-stage synthesis filter.

32. A method according to claim 25, wherein said step of outputting signal of interest match scores includes outputting refined signal complex time domain data from said at least one of said plurality of synthesis filter receivers.

33. A method according to claim 25, wherein said step of transforming said time domain candidate signal into complex spectral data via said at least one of said plurality of synthesis filter receivers includes receiving said time domain candidate signal repeatedly in cascaded sequence for further signal data filtering and tuning.

34. A method according to claim 25, wherein said steps of transforming said time domain candidate signal via said at least one of said plurality of synthesis filter receivers includes receiving and demodulating said time domain candidate signal in cascaded sequence using demodulated output from a first tier synthesis filter controller and demodulator as an input to a second tier synthesis filter receiver and demodulator.

35. A method according to claim 25, further comprises a step of a priori or adaptively beamforming said complex spectral data so as to enhance the signal quality in order to demodulate and recognize a signal of interest.

36. A method according to claim 35, further comprises a step of a priori or adaptively combining said complex spectral data to enhance the signal quality of a range or ranges of said complex spectral data.

37. A method according to claim 35, further comprises steps of counting said complex spectral data with reference to one pulse per second and determining the time interval of sampling said complex spectral data.

38. A method for demodulating and recognizing a complex spectral signal of interest, comprising the steps of:
    accessing said complex spectral signal to be processed stored in a buffer memory;
    synthesis filtering of said complex spectral signal so as to generate a complex time domain signal based on said complex spectral signal;

demodulating said complex time domain signal;
conducting further processing of said demodulated signal to determine further signal parameters;
comparing said signal parameters to one or more predetermined signals of interest parameters and computing a weighted score based on parameter matches from said comparing; and
thresholding said score of said parameter matches between said one or more predetermined signal parameters and said demodulated signal parameters, and outputting respective signal of interest scores above threshold as indication of signal of interest recognition.

39. A method according to claim 38, wherein said synthesis filtering step further comprises a step of a priori or adaptively beamforming said complex time domain signal.

40. A method according to claim 39, wherein said synthesis filtering step further comprises a step of a priori or adaptively combining the complex time domain signal to enhance the signal quality of a range or ranges of said complex time domain signal.

41. A method according to claim 38, wherein said step of conducting further processing of said demodulated signal includes steps of interpreting said complex time domain signal and determining the time of arrival of said signal.

42. A system for direction finding of a signal, comprising:
a plurality of wideband receivers for receiving input data from a plurality of wideband sensor sources, each of said receivers having a corresponding sensor or antenna source spatially separated from the corresponding sensors or antennas of other receivers;
a sub-band decimation module for each respective receiver, for decimating the plurality of wideband sensor sources into a plurality of sub-band data streams to be processed;
a channelizing module for Fast Fourier Transform channelizing said plurality of sub-band data streams from said plurality of wideband sensor sources into a respective plurality of complex spectral component streams;
a processing module for signal processing said plurality of complex spectral component streams, including a means for determining the presence of at least one signal of interest based on multiple spectral magnitude running averages and analysis of said plurality of complex spectral component streams;
a direction finding module for determining an angle-of-arrival of the at least one signal of interest based on the analysis of said processing module and said plurality of complex spectral component streams; and
a high speed data router coupling each module to one another for digitally routing respective data between said sub-band decimation, channelizing, processing and direction finding modules.

43. A system according to claim 42, wherein said sub-band decimation module includes an analog-to-digital converter (ADC) for converting said plurality of wideband received sensor input data, and a plurality of digital decimators operatively connected to said ADC so as to each generate a corresponding sub-band data stream of the digitally decimated wideband sensor signal.

44. A system according to claim 42, wherein said channelizing module includes a plurality of Fast Fourier Transform (FFT) channelizers operatively connected to receive corresponding ones of said plurality of sub-band data streams and thereby generate a corresponding plurality of the complex spectral component streams.

45. A system according to claim 42, wherein said plurality of complex data streams output from the channelizing module are operatively connected to subsequent modules by a high speed data router.

46. A system according to claim 44, wherein said processing module includes a plurality of channel processors operatively connected to said data router so as to receive corresponding ones of said plurality of complex spectral component streams, each of said channel processors being formed so as to determine the presence of at least one signal of interest within the corresponding complex spectral component streams of first sensor thereof.

47. A system according to claim 46, wherein said channel processors for determining the presence of at least one signal of interest includes, within each of said plurality of channel processors:
a First-In-Tap-Out (FITO) delay memory operatively connected to receive and store said corresponding complex spectral component streams from said data router of said first sensor, and
a detection processor for conducting spectral filter convolution of said corresponding complex spectral component streams stored in said FITO delay memory, and for generating spectral parameter data on said corresponding complex spectral component stream based on spectral magnitude running averages on said corresponding complex spectral component stream.

48. A system according to claim 44, wherein each of said plurality of Fast Fourier Transform (FFT) channelizers includes means for hyperchannelizing the corresponding one of said plurality of sub-band data streams in generating said corresponding complex spectral component stream.

49. A system according to claim 48, wherein said means for hyperchannelizing includes a plurality of FFT engines operatively connected to generate complex time-overlapped spectral data streams.

50. A system according to claim 44, wherein said direction finding module includes means for multichannel calibration of said complex spectral component streams from said plurality of FFT channelizers, and means for determining an angle-of-arrival of the at least one signal of interest based on the analysis of said processing module.

51. A system according to claim 47, wherein said direction finding module includes means for multichannel calibration of said complex spectral component streams from said plurality of FFT channelizers, and means for determining said angle-of-arrival of the at least one signal of interest based on the spectral parameter data generated by said processing module.

52. A system according to claim 50, wherein said means for determining the angle-of-arrival includes means for implementing N-channel interferometric means to determine the angle-of-arrival.

53. A system according to claim 51, wherein said means for determining the angle-of-arrival includes means for implementing a 2-channel commutated algorithm to determine the angle-of-arrival.

54. A system according to claim 51, wherein said means for determining the angle-of-arrival includes means for implementing 3-channel comparative algorithm to determine the angle-of-arrival.

55. A system according to claim 42, further comprises a phase-coherent module for converting said sub-band data streams containing the same frequency range or ranges to be phase coherent, wherein said sensors or antenna sources sharing at least one common frequency range.

56. A system according to claim 42, wherein said processing module further comprises a beamforming module for enhancing the signal quality of a range or ranges of channelized complex spectral component streams by a priori or adaptively combining the channelized component streams, wherein said sensors or antenna sources sharing at least one common frequency range.

57. A system according to claim 42, further comprises:
   a reference time frame source for synchronously converting sub-band signals from analog to digital for measuring the time of arrival of each wideband signal from each said receiver;
   a time-of arrival measuring module for calibrating delay from antennas or signal sources to ADC and determining the time of arrival of each wideband signal from each said receiver; and
   a module for comparing one or more pairs of said times of arrival if available, and creating Time Difference of Arrival (TDOA) measurements which are interpreted as hyperbolic lines of bearing.

58. A system according to claim 42, further comprises a position-locating module for combining multiple angle-of-arrivals or hyperbolic lines of bearing from spatially distributed antennas or signal sources, and determining geolocation of at least one signal of interest.

59. A system according to claim 57, further comprises a position-locating module for combining multiple angle-of-arrivals or hyperbolic lines of bearing from spatially distributed antennas or signal sources, and determining geolocation of at least one signal of interest.

60. A method for direction finding of a signal, comprising the steps of:
   providing a plurality of spatially separated antennas;
   receiving a plurality of wideband source signals via said plurality of antennas;
   decimating the plurality of wideband source signals into a plurality of sub-band data streams to be processed;
   Fast Fourier Transform channelizing said plurality of sub-band data streams into a respective plurality of complex spectral component streams;
   determining the presence of at least one signal of interest based on spectral signal activity analysis of spectral magnitudes of said plurality of complex spectral component streams of first channel source; and
   determining an angle-of-arrival of the at least one signal of interest based on the spectral signal activity analysis;
   wherein said step of determining the presence of at least one signal of interest includes delay-memory storing said plurality of complex spectral component streams, conducting spectral convolution of said plurality of complex spectral component streams, and generating spectral parameter data on said plurality of complex spectral component streams of first source signal data.

61. A method according to claim 60, wherein said step of generating spectral parameter data includes generating spectral magnitude running averages on said plurality of complex spectral component streams.

62. A method according to claim 60, wherein said step of generating spectral parameter data includes generating filter data on said plurality of complex spectral component streams using two-stage synthesis filter.

63. A method for direction finding of a signal, comprising the steps of:
   providing a plurality of spatially separated antennas;
   receiving a plurality of wideband source signals via said plurality of antennas;
   decimating the plurality of wideband source signals into a plurality of sub-band data streams to be processed;
   Fast Fourier Transform channelizing said plurality of sub-band data streams into a respective plurality of complex spectral component streams;
   determining the presence of at least one signal of interest based on spectral signal activity analysis of spectral magnitudes of said plurality of complex spectral component streams of first channel source; and
   determining an angle-of-arrival of the at least one signal of interest based on the spectral signal activity analysis;
   wherein said step of determining an angle-of-arrival includes multichannel calibrating said plurality of complex spectral component streams, common filtering, and determining an angle-of-arrival of the at least one signal of interest based on the spectral analysis.

* * * * *